(12) United States Patent
Haga et al.

(10) Patent No.: US 12,462,373 B2
(45) Date of Patent: Nov. 4, 2025

(54) SUBSTANCE DISPENSE EVALUATION SYSTEM

(71) Applicant: Beckman Coulter, Inc., Brea, CA (US)

(72) Inventors: Tadashi Haga, Shizuoka (JP); Tomohiko Takeuchi, Shizuoka (JP)

(73) Assignee: Beckman Coulter, Inc., Brea, CA (US)

( * ) Notice: Subject to any disclaimer, the term of this patent is extended or adjusted under 35 U.S.C. 154(b) by 233 days.

(21) Appl. No.: 18/116,010

(22) Filed: Mar. 1, 2023

(65) Prior Publication Data
US 2023/0281788 A1   Sep. 7, 2023

Related U.S. Application Data

(63) Continuation of application No. 17/246,222, filed on Apr. 30, 2021, now Pat. No. 11,599,985, which is a
(Continued)

(51) Int. Cl.
*G06T 7/00* (2017.01)
*B01L 3/00* (2006.01)
(Continued)

(52) U.S. Cl.
CPC .......... *G06T 7/0008* (2013.01); *B01L 3/5085* (2013.01); *G01N 35/1011* (2013.01); *G06T 7/90* (2017.01); *B01L 2200/0605* (2013.01); *B01L 2200/143* (2013.01); *B01L 2200/148* (2013.01); *G06T 2207/10024* (2013.01); *G06T 2207/30164* (2013.01); *G06T 2207/30232* (2013.01)

(58) Field of Classification Search
CPC .................... G06T 7/0008
USPC ........................................ 348/143
See application file for complete search history.

(56) References Cited

U.S. PATENT DOCUMENTS

| 7,025,933 B2 | 4/2006 | Ganz et al. |
| 7,404,861 B2 | 7/2008 | Prentice et al. |
(Continued)

FOREIGN PATENT DOCUMENTS

| JP | D1235922 S | 2/2005 |
| JP | 2011-237344 A | 11/2011 |
| JP | 2012-008077 A | 1/2012 |

OTHER PUBLICATIONS

International Search Report and Written Opinion for PCT/US2017/040444 dated Oct. 11, 2017, 9 pages.
(Continued)

*Primary Examiner* — Amir Shahnami
(74) *Attorney, Agent, or Firm* — FROST BROWN TODD LLP

(57) ABSTRACT

An automated analysis instrument operates to detect inadequate dispensation of a fluidic substance on a tray. The instrument includes an image capturing device to capture an image of at least a portion of the tray including a receptacle portion and a surrounding portion around the receptacle portion. The instrument then identifies the surrounding portion of the at least the portion of the tray in the image, evaluates color components of the image corresponding to the surrounding portion of the at least the portion of the tray, and determines whether the fluidic substance is present on the surrounding portion of the at least the portion of the tray based on at least one of the color components.

20 Claims, 22 Drawing Sheets

Related U.S. Application Data continuation of application No. 16/313,581, filed as application No. PCT/US2017/040444 on Jun. 30, 2017, now Pat. No. 10,997,709.

(60) Provisional application No. 62/357,096, filed on Jun. 30, 2016.

(51) Int. Cl.
*G01N 35/10* (2006.01)
*G06T 7/90* (2017.01)

(56) References Cited

U.S. PATENT DOCUMENTS

| | | | |
|---|---|---|---|
| 7,629,173 | B2 | 12/2009 | Gollier et al. |
| 7,823,535 | B2 | 11/2010 | Hanafusa et al. |
| 7,830,513 | B2 | 11/2010 | Dailey, Jr. et al. |
| 7,923,056 | B2 | 4/2011 | Read |
| 8,126,233 | B2 | 2/2012 | Ward et al. |
| 8,142,734 | B2 | 3/2012 | Takeuchi |
| 8,508,588 | B2 | 8/2013 | Bello et al. |
| 2003/0111494 | A1 | 6/2003 | Lin et al. |
| 2003/0232123 | A1 | 12/2003 | Bass et al. |
| 2004/0022689 | A1 | 2/2004 | Wulf et al. |
| 2010/0239137 | A1* | 9/2010 | Pugia ............ G01N 21/274 382/128 |
| 2012/0212748 | A1 | 8/2012 | Hollenbeck et al. |
| 2014/0130614 | A1 | 5/2014 | Zeng |
| 2015/0184996 | A1 | 7/2015 | Crowell, III et al. |
| 2016/0045918 | A1 | 2/2016 | Lapham |
| 2016/0055653 | A1* | 2/2016 | Badawy ............ G06T 7/90 348/143 |
| 2018/0290779 | A1 | 10/2018 | Christopher |
| 2018/0304293 | A1* | 10/2018 | Orla-Jensen ....... G01N 15/0227 |

OTHER PUBLICATIONS

Japanese Office Action for JP 2018-568738 dated May 21, 2021, 3 pages.
Japanese Search Report for JP 2018-568738 dated May 19, 2021, 17 pages.
European Communication for EP 17745547 dated Mar. 10, 2021, 5 pages.

* cited by examiner

| FRAGMENT ID | PARAMETER 1 | PARAMETER 2 | PARAMETER 3 |
|---|---|---|---|
| 1 | 12 | 15 | 03 |
| 2 | 13 | 14 | 05 |
| 3 | 15 | 13 | 05 |
| 4 | 15 | 15 | 04 |
| 5 | 13 | 17 | 03 |
| 6 | 17 | 20 | 05 |
| 7 | 11 | 22 | 07 |
| ⋮ | ⋮ | ⋮ | ⋮ |
| 130567 | 78 | 37 | 13 |
| 130568 | 77 | 38 | 12 |
| 130569 | 79 | 34 | 14 |

*FIG. 12*

| SUBSTANCE TYPE 492 | | PARAMETER SELECTION 494 | | | FIRST THRESHOLD (RATIO) 552A | FIRST THRESHOLD (DIFFERENCE) 552B | SECOND THRESHOLD 554 |
|---|---|---|---|---|---|---|---|
| | | PARAMETERS USED | | | | | |
| SAMPLE TYPE | REAGENT TYPE | PARA 1 474 | PARA 2 476 | PARA 3 478 | | | |
| Red Blood Cells | Reagent 1 | YES | YES | NO | 0.95 | 5 | 50 |
| Red Blood Cells | Reagent 2 | YES | YES | NO | 0.95 | 5 | 100 |
| Red Blood Cells | Reagent 3 | YES | NO | YES | 0.85 | 10 | 80 |
| Red Blood Cells | Reagent 4 | NO | YES | YES | 0.95 | 5 | 50 |
| Red Blood Cells | Reagent 5 | YES | NO | YES | 0.90 | 12 | 60 |
| ....... | ....... | ....... | ....... | ....... | ....... | ....... | ....... |
| Plasma | Reagent 1 | YES | NO | YES | 0.95 | 12 | 50 |
| Plasma | Reagent 2 | NO | YES | YES | 0.95 | 5 | 50 |
| Plasma | Reagent 3 | YES | NO | YES | 0.98 | 7 | 70 |
| ....... | ....... | ....... | ....... | ....... | ....... | ....... | ....... |

*FIG. 13*

| Example of thresholds | | | | | | |
|---|---|---|---|---|---|---|
| Type of threshold | G/R | B/R | G/B | |G-R| | |B-R| | |G-B| |
| First Threshold | 1.02 | 1.05 | 1.08 | 300 | 400 | 300 |
| Second Threshold | 2281 | 2281 | 2281 | 2281 | 2281 | 2281 |

FIG. 19

Inadequate dispensation (750)

| liquid | color | manufacturer | G/R | B/R | G/B | [G-R] | [B-R] | [G-B] |
|---|---|---|---|---|---|---|---|---|
| anti-A | blue | Manuf. #1 | 20644 | 15590 | 0 | 0 | 8 | 34 |
| anti-B | yellow | Manuf. #1 | 3963 | 1210 | 0 | 0 | 0 | 18 |
| Control | purple | Manuf. #1 | 3342 | 3495 | 0 | 235 | 0 | 1201 |
| anti-D | green | Manuf. #1 | 17897 | 3514 | 0 | 0 | 0 | 47 |
| anti-K | orange | Manuf. #1 | 2524 | 1167 | 0 | 0 | 0 | 9 |
| 1.5% Red Blood Cells | red | Manuf. #1 | 1593 | 1284 | 16180 | 14998 | 16219 | 16383 |
| TPHA Cells | brown | Manuf. #2 | 1155 | 165 | 17193 | 10707 | 15991 | 17700 |
| anti-A | blue | Manuf. #3 | 19474 | 13201 | 0 | 1859 | 3086 | 120 |
| diluted anti-A | light blue | Manuf. #3 | 4283 | 357 | 0 | 0 | 0 | 6 |
| anti-B | yellow | Manuf. #3 | 2252 | 204 | 16354 | 0 | 14088 | 16882 |
| diluted anti-B | light yellow | Manuf. #3 | 4606 | 515 | 0 | 0 | 0 | 2 |
| diluted plasma at twice | light yellow | | 3672 | 1623 | 0 | 0 | 0 | 7 |
| diluted plasma at 5 times | almost colorless | | 2997 | 1507 | 18 | 0 | 83 | 632 |
| water | colorless | | 3340 | 467 | 0 | 0 | 0 | 0 |

Number of pixels exceeding the first threshold (732)

*FIG. 21*

SUBSTANCE DISPENSE EVALUATION SYSTEM

This application is a continuation of U.S. application Ser. No. 17/246,222 filed on Apr. 30, 2021, titled Substance Dispense Evaluation System, which is a continuation of U.S. application Ser. No. 16/313,581 filed on Dec. 27, 2018 (issued as U.S. Pat. No. 10,997,709) as a national stage entry of PCT International application PCT/US2017/040444, filed in the USPTO on Jun. 30, 2017, which claims the benefit of priority to U.S. Provisional Patent Application No. 62/357,096, filed on Jun. 30, 2016, titled Substance Dispense Evaluation System, the disclosures of which are hereby incorporated by reference in their entirety.

BACKGROUND

Some biological sample analysis instruments utilize a system for dispensing fluidic substances, such as blood samples or other bodily fluids, for analysis, as well as reagents or blood samples, for analysis. For example, in a blood analysis system, reagents are dispensed on reaction wells of a tray. In some cases, the tray may not be accurately aligned with reagent pipettors for various possible reasons, and the reagent can be inadvertently dispensed onto the surface of the tray instead of into the reaction wells. Improper dispensation of reagents may cause false results which are reported by the analysis instrument in the same manner as true results. For example, in a blood analysis system, improper dispensation of reagents may result in a false negative agglutination pattern. False positive results may also result from dispensing errors.

Several approaches have been used to attempt to detect improper dispensation of reagents. In certain examples, sensors are used to detect positions of dispensing probes relative to a tray at the time of dispensation, or to monitor the inner pressure of probe tubing to detect discharge of reagents or samples. In other examples, agglutination patterns are image-processed and evaluated. However, these approaches have not been found to be adequate. For example, such approaches cannot completely separate true negative patterns from false negative patterns and/or true positive patterns from false positive patterns.

SUMMARY

In general terms, this disclosure is directed to a system for evaluating fluidic substance dispensation. In one possible configuration and by non-limiting example, the system employs photometric analysis of a tray on which a fluidic substance is dispensed. Various aspects are described in this disclosure, which include, but are not limited to, the following aspects.

One aspect is a method of evaluating dispensation of a fluidic substance on a tray in an automated analysis instrument. The method includes capturing, using an image capturing device, an image of at least a portion of the tray, the at least a portion of the tray including a receptacle portion and a surrounding portion around the receptacle portion; identifying, using at least one computing device, the surrounding portion of the at least the portion of the tray in the image; evaluating color components of the image corresponding to the surrounding portion of the at least the portion of the tray; and determining whether the fluidic substance is present on the surrounding portion of the at least the portion of the tray based on at least one of the color components.

Another aspect is a system for evaluating dispensation of a fluidic substance dispensed in an automated analyzer. The system includes a tray including a plurality of receptacles and a plurality of surrounding portions around the plurality of receptacles; a dispense device configured to dispense a fluidic substance on the tray; an image capturing device configured to capture at least one image of at least a portion of the tray; at least one processing device; at least one computer readable storage medium storing software instructions that, when executed by the at least one processing device, cause the system to: capture an image of at least a portion of the tray, the at least a portion of the tray including a receptacle portion and a surrounding portion around the receptacle portion; identify the surrounding portion of the at least a portion of the tray in the image; evaluate color components of the image corresponding to the surrounding portion of the at least a portion of the tray; and determine whether the fluidic substance is present on the surrounding portion of the at least a portion of the tray based on at least one of the color components.

Yet another aspect is a computer-readable storage medium comprising software instructions that, when executed by at least one processing device of a substance dispensation evaluation system, cause the substance dispensation evaluation system in an automated analyzer to: obtain an image of at least a portion of a tray, the at least the portion of the tray including a receptacle portion and a surrounding portion around at least one open end of the receptacle portion; identify a first image portion of the image, the first image portion corresponding to the surrounding portion of the at least the portion of the tray, the first image portion including a plurality of image fragments; for each of the plurality of image fragments, obtain a value associated with a color of the image fragment; compare the value with a first threshold; and designate the image fragment as a counted image fragment if the value of the image fragment does not meet the first threshold; compare a number of the counted image fragments with a second threshold; and designate the at least the portion of the tray as a flagged tray if the number of the counted image fragments does not meet the second threshold, the flagged tray representative of inappropriate dispensation of a fluidic substance to the at least the portion of the tray.

BRIEF DESCRIPTION OF THE DRAWINGS

FIG. 12 illustrates an example data set that includes color parameter values representative of each image fragment.

FIG. 13 illustrates an example data set in which two color parameters are selected from three color parameters based on a type of fluidic substance.

FIG. 19 illustrates an example table of first and second thresholds.

FIG. 21 illustrates an example test result table that shows inadequate dispensation based on the first and second thresholds shown in FIG. 19.

DETAILED DESCRIPTION

Figure 1:
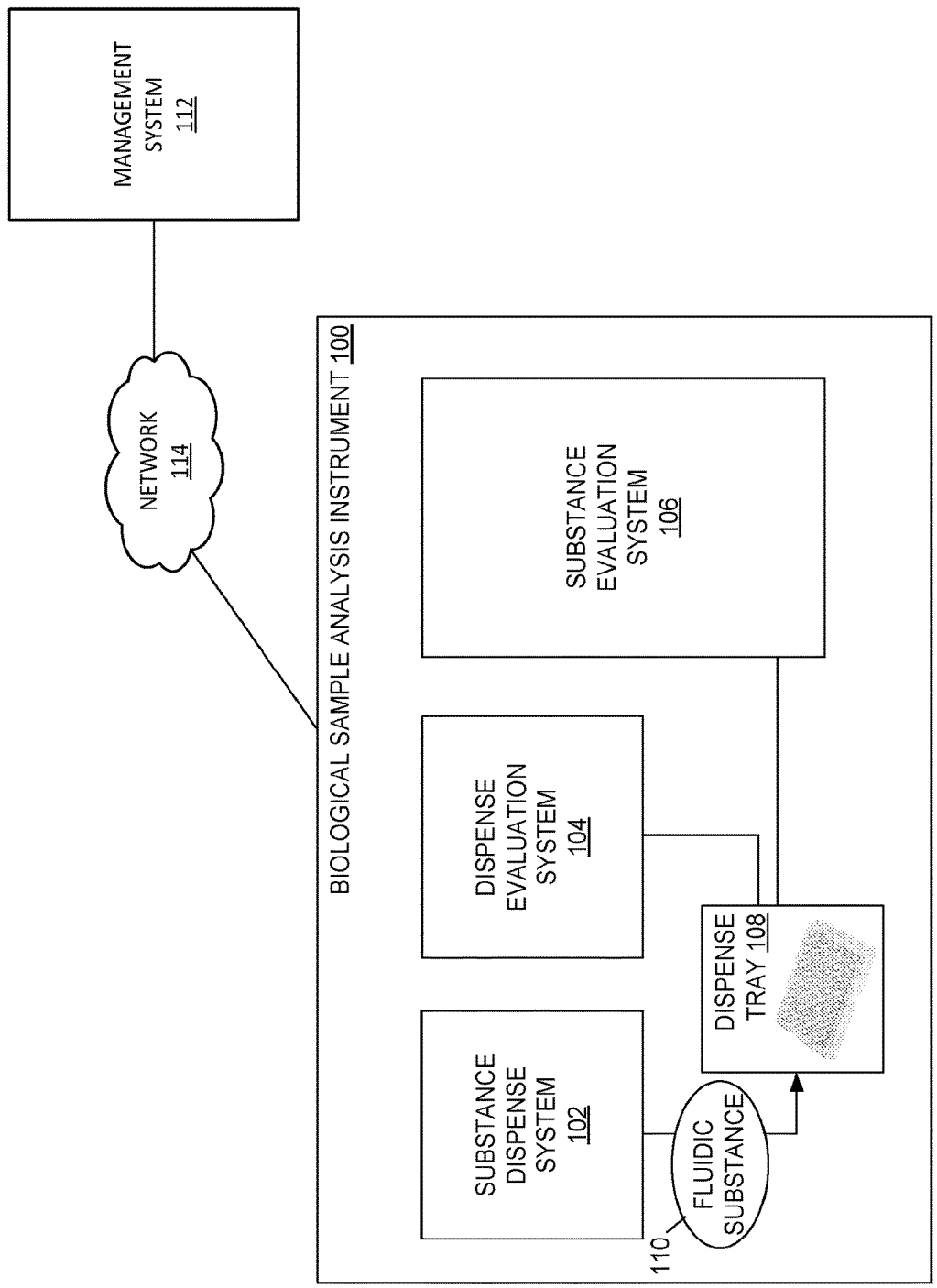
FIG. 1 schematically illustrates an example instrument for analyzing a biological sample.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 schematically illustrates an example instrument 100 for analyzing a biological sample. In some embodiments, the instrument 100 includes a substance dispense system 102 and a substance dispense evaluation system 104. A tray 108 is used to receive and contain a fluidic substance 110 and is utilized by the systems 102 and 104 of the instrument 100. In some embodiments, the instrument 100 is automated or semi-automated, wherein the tray 108 is used by the systems 102 and 104 independent of a human operator of the instrument, or with minimal intervention from an operator.

In other embodiments, the instrument 100 further includes a substance evaluation system 106. A tray 108 is used to receive and contain a fluidic substance 110 and is utilized by the systems 102, 104, and 106 of the instrument 100. In some embodiments, the instrument 100 is automated or semi-automated, wherein the tray 108 is used by the systems 102, 104, and 106 independent of a human operator of the instrument, or with minimal intervention from an operator.

The biological sample analysis instrument 100 operates to analyze a biological sample for various purposes. In some embodiments, the biological sample analysis instrument 100 includes a blood sample analysis instrument or apparatus. In some embodiments, the biological sample analysis instrument 100 operates to collect, test, process, store, and/or transfuse blood and its components, for example. The blood collection may occur at donor centers. The collected blood, and its components, are then often processed, tested, and distributed at or through blood banks or clinical laboratories.

In the illustrated example, the instrument 100 is configured to perform various types of blood tests, such as blood donor screening. For example, the instrument 100 offers automated simultaneous testing for ABO/Rh including weak D, cytomegalovirus testing, and syphilis screening. In some examples, the determination of an ABO Blood group is defined by demonstrating the presence or absence of antigens A and/or B on the surface of human red blood cells and detecting the presence or absence of Anti-A and/or Anti-B antibodies in the plasma. As described herein, the instrument 100 analyzes a biological sample (i.e., the fluidic substance 110), such as a mixture of a blood sample, a diluent, and/or a reagent, dispensed on the tray 108, such as a microplate having a plurality of reaction wells.

The substance dispense system 102 operates to dispense a fluidic substance 110 on the tray 108. In some embodiments, the substance dispense system 102 includes one or more pipetting devices. A pipetting device may be fluidly connected to one or more bulk containers for delivery of reagents, diluents and buffers, for example. Alternatively, a pipetting device operates to pipet fluidic substance from a sample container into a well of tray 108. Such pipetting may be directed from a sample tube to the tray 108, or may involve multiple pipetting steps, such as if an aliquot of sample is held in a secondary tube before transfer into tray 108. In the illustrated example of a blood sample analysis, the fluidic substance 110 can be any of a blood sample, a diluent, and a reagent, or any mixture thereof. The blood sample includes red blood cells and blood plasma. The reagent can be of various types. Some examples of reagents include liquid reagents containing antibody, liquid reagents containing non-reactive ingredients, red blood cells suspensions, and particle suspensions. Reagents have different colors. Some reagents can be colored to allow a user to distinguish the reagent from other substances. The colors of such reagents vary, including green, purple, yellow, blue, and red. Examples of the reagent include blood grouping reagents, such as Anti-A, Anti-B, Anti-A,B, Anti-D, Anti-C, Anti-E, Anti-c, Anti-e, and Anti-K reagents. The Anti-A, Anti-B, and Anti-A,B reagents are used in red blood cell determination of the ABO blood group by determining the absence or presence of erythrocytic antigens A and/or B on the surface of human red blood cells. The Anti-D reagents, such as Anti-D, Anti-D (PK1), and Anti-D (PK2), are used to determine the Rh type by detecting the presence of the D (Rh) antigen on the surface of human red blood cells. The Anti-C, Anti-E, Anti-c, Anti-e, and Anti-K are used for Rh-Kell phenotyping of human red blood cells by detecting the presence of antigens C,E,c,e, and K on the surface of red blood cells. In other embodiments, the fluidic substance 110 can be of any types suitable for being dispensed on a container or tray and presented for further analysis.

The dispense evaluation system 104 operates to evaluate the dispensation of the fluidic substance 110. In particular, the dispense evaluation system 104 determines whether the fluidic substance 110 has been appropriately dispensed on the tray 108 as intended for subsequent analysis by, for example, the substance evaluation system 106. An inappropriate dispensation of a fluidic substance on the tray 108 can cause a false result that may be indistinguishable from a true result, for example, or may otherwise compromise the operation of the biological sample analysis instrument 100.

The substance evaluation system 106 operates to evaluate the fluidic substance 110 that is contained on the tray 108. By way of example, the substance evaluation system 106 performs blood donor screening or blood transfusion inspection, which is described in more detail with reference to FIG.

2. Other types of analysis or evaluation can be performed by the substance evaluation system 106 for various purposes. By way of examples, the substance evaluation system 106 may utilize any known analytic method and detection systems compatible with the tray 108 to analyze a plurality of fluidic substances 110. Common examples include spectrophotometric detection and analysis to perform clinical chemistry testing, immunoassays, microbiological identification and antibiotic susceptibility testing, and nucleic acid testing using fluorescent-labeled primers and probes. Other analytical methods compatible with semi-automated or automated sample handling on trays are also known and compatible with the principles of the present disclosure. Some biological sample analysis instruments 100 may be user configurable for selection of a substance evaluation system 106 suitable for a variety of research or diagnostic analysis.

The tray 108 is configured to receive the fluidic substance 110 from the substance dispense system 102 and hold the fluidic substance 110 for processes performed by the substance evaluation system 106. By way of examples, the tray 108 can be a multi-well plate, a microtiter plate, a multi-well panel, a multi-well cassette, a multi-well microfluidic device, a multi-well slide, a multi-well container, any holding device with multiple wells for receiving, holding, and/or reacting fluids, or any combination of the foregoing. An example of the tray 108 is illustrated and described with reference to FIGS. 4, 6, and 7.

The fluidic substance 110 is dispensed on the tray 108 by the substance dispense system 102. In some embodiments, the fluidic substance 110 is then examined by the substance evaluation system 106. The fluidic substance includes any substance that can be dispensed by the substance dispense system 102 and contained in the tray 108. In some embodiments, the fluidic substance 110 is a fluid of single substance. In other embodiments, the fluidic substance 110 is a mixture of a plurality of substances. In various embodiments, the fluidic substance 110 may be a sample to be subjected to analysis, sample preparation components, diluents, buffers, reagents, or any combinations of the foregoing. Where the fluidic substance 110 involves blood or its components, examples of the fluidic substance 110 include whole blood, blood plasma, serum, red blood cells, white blood cells, platelets, diluents, reagents, or any combinations thereof.

In the illustrated example of a blood sample analysis, the fluidic substance 110 can be any of a blood sample, a diluent, and a reagent, or any mixture thereof. The reagent can be of various types. Some examples of reagents include liquid reagents containing labeled specific binding reagents, for example antibody or nucleic acid probes, liquid reagents containing reactive and/or non-reactive ingredients, red blood cells suspensions, and particle suspensions. Reagents may have different colors or produce different colors upon reaction. Some reagents can be colored to allow a user to distinguish the reagent from other substances. The colors of such reagents vary, including green, purple, yellow, blue, and red. Examples of the reagent include blood grouping reagents, such as Anti-A, Anti-B, Anti-A,B, Anti-D, Anti-C, Anti-E, Anti-c, Anti-e, and Anti-K, and Anti-k reagents. The Anti-A, Anti-B, and Anti-A,B reagents are used in red blood cell determination of the ABO blood group by determining the absence or presence of erythrocytic A antigen and/or B antigen on the surface of human red blood cells. The Anti-D reagents, such as Anti-D, Anti-D (PK1), and Anti-D (PK2), are used to determine the Rh type by detecting the presence of the D (Rh) antigen on the surface of human red blood cells. The Anti-C, Anti-E, Anti-c, Anti-e, Anti-K and Anti-k are used for Rh phenotyping and Kell phenotyping of human red blood cells by detecting the presence of antigens C,E,c,e, and K and k on the surface of red blood cells. In other embodiments, the fluidic substance 110 can be of any types suitable for being dispensed on a container or tray and presented for further analysis. Furthermore, the fluidic substance can be other types of bodily fluidic substances, such as saliva, cerebral spinal fluid, urine, amniotic fluid, urine, feces, mucus, cell or tissue extracts, nucleic acids, or any other type of bodily fluid, tissue or material which is suspected of containing an analyte of interest.

In some embodiments, the fluidic substance 110 has a color different from a color of the tray 108. In some embodiments, at least a surrounding portion 322 (FIG. 4) of the tray 108 has a color that is distinguishable from the color of the fluidic substance 110.

With continued reference to FIG. 1, in some embodiments, the instrument 100 operates to communicate with a management system 112 via a data communication network 114. For example, the instrument 100 includes a communication device (such as a communication device 246 in FIG. 3) through which the instrument 100 communicates with the management system 112.

In some embodiments, the management system 112 is remotely located from the instrument 100 and configured to perform diagnosis based on data from the instrument 100. In addition, the instrument 100 can evaluate performance of the instrument and generate a report. One example of the management system 112 includes one or more computing devices executing PROSevice Remote Service Application available from Beckman Coulter, Inc., Brea, Calif.

The Beckman Coulter ProService Remote Service Application can provide a secure and continuous connection between the biological sample analysis instrument 100 and a remote diagnosis command center (e.g., the management system 112) over a network (e.g., the network 114) using a Remote Application Processor (RAP) box. The RAP box can connect the biological sample analysis instrument 100 to the remote diagnosis command center by way of the Internet via Ethernet port, Wi-Fi, or cellular network. The biological sample analysis instrument 100 can send the instrument data, such as instances of flagged trays, to the RAP box. The RAP box can then secures this data and forwards it to the remote diagnosis command center. All communications between the biological sample analysis instrument 100 and the remote diagnosis command center can be coordinated through the RAP box. The RAP box can connect to the network using a static or Dynamic Host Configuration Protocol (DHCP) IP address. The RAP box can be a hardware having computer processing boards and connection ports capable of providing a secure transfer of instrument data from the biological sample analysis instrument 100 to the remote diagnosis command center. For example, the RAP box can have one or more Ethernet connection ports, one or more computer processing boards for Wi-Fi or cellular network connectivity, an electrical outlet connection port, or any combination of the foregoing.

The RAP box can have an internal firewall to provide a secure and continuous transfer of instrument data from the biological sample analysis instrument 100 and the remote diagnosis command center. This internal firewall can create a private instrument network which isolates the biological sample analysis instrument 100 from other network traffic that exists on the network. Furthermore, the RAP box can secure the data transmission from the one or more analyzers to the biological sample analysis instrument 100 by the following one or more mechanisms. First, the outboundinitiated data messages are secured via encryption and sent through a firewall via HTTPS on Port 443, the standard port for secure Internet usage. Data is transmitted during Secure Sockets Layer (SSL), which is a protocol for transmitting information securely via the Internet. SSL creates a secure connection between a client and a server, over which data can be sent securely. Dual certification authentication helps prevent unauthorized access to transmitted data. An example of a SSL connection is the 128 bit AES, FIPS compliant encryption algorithm. Another mechanism that the RAP box can secure the data is using a Remote Desktop Sharing (RDS) session. An RDS session is held through a secure Virtual Private Network (VPN) tunnel, which encapsulates the session between the biological sample analysis instrument 100 and the remote diagnosis command center to ensure no third-party interception of the data being shared.

Still referring to FIG. 1, the data communication network 114 communicates digital data between one or more computing devices, such as between the data collection device 108 and the data processing system 112. Examples of the network 114 include a local area network and a wide area network, such as the Internet. In some embodiments, the network 114 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as utilizing wireless routers or wireless access points), cellular communication devices (such as utilizing one or more cellular base stations), and other wireless communication devices.

Figure 2:
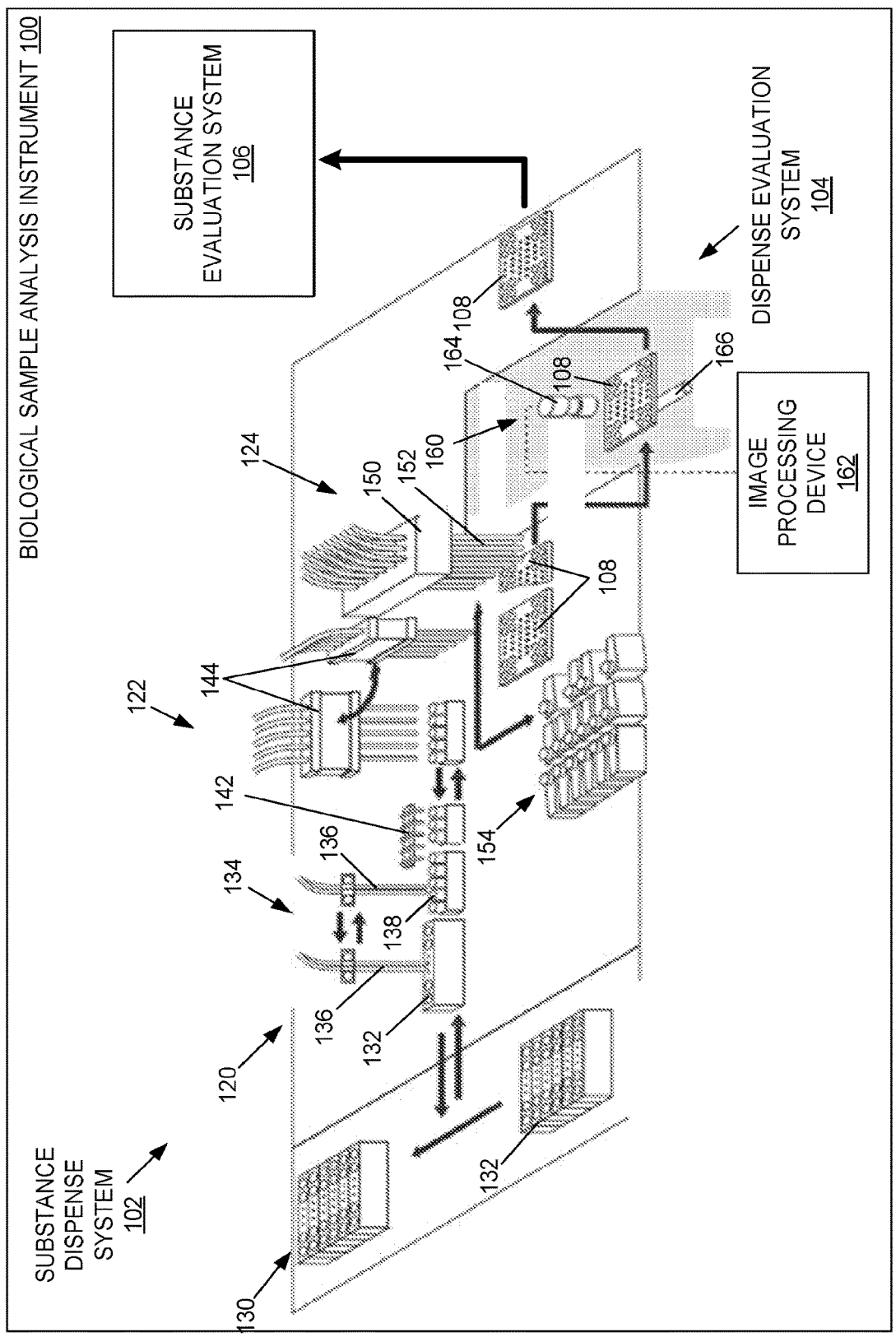
FIG. 2 schematically illustrates another example of the instrument for analyzing a biological sample.

FIG. 2 schematically illustrates another example of the instrument 100 for analyzing a biological sample. As described in FIG. 1, the instrument 100 includes the substance dispense system 102, the dispense evaluation system 104, and the substance evaluation system 106.

In the illustrated example, the biological sample analysis instrument 100 is configured to analyze a blood sample. In some embodiments, the substance dispense system 102 includes a sample dispense system 120, a diluent dispense system 122, and a reagent dispense system 124.

The sample dispense system 120 operates to dispense a blood sample. In some embodiments, the sample dispense system 120 includes a sample rack feeder 130 that stores one or more sample racks 132. At least one of the sample racks 132 are selected and transferred to a location adjacent a sample aspiration unit 134. The sample aspiration unit 134 includes a sample pipettor 136 that aspirates a blood sample from the transferred sample rack, transfers the aspirated blood sample, and dispenses the blood sample to one or more reaction tubes 138. In some embodiments, the reaction tubes 138 containing the blood sample are transferred to the diluent dispense system 122. Alternatively, the diluent dispense system 122 moves close to the reaction tubes 138 containing the blood sample.

The diluent dispense system 122 operates to dilute the sample. In some embodiments, the diluent dispense system 122 includes a diluent dispense unit 142 and a diluted sample transfer unit 144. The diluent dispense unit 142 operates to dispense a diluent into the reaction tubes 138 containing the blood sample. The diluted sample transfer unit 144 transfers the reaction tubes 138 containing a mixture of the blood sample and the diluent to a tray 108. In some embodiments, the diluted sample transfer unit 144 operates to aspirate the mixture of the blood sample and the diluent from the reaction tubes 138 and dispense the aspirated substance on the tray 108.

The reagent dispense system 124 operates to dispense a reagent on the tray 108 containing the mixture of the blood sample and the diluent. The reagent dispense system 124 includes a reagent transfer and dispense unit 150. In some embodiments, the reagent transfer and dispense unit 150 includes one or more reagent dispense pipettors 152. In some embodiments, the reagent transfer and dispense unit 150 moves to a reagent supply 154 and aspirate a reagent therefrom via the dispense pipettors 152, and returns to the tray 108. Then, the reagent transfer and dispense unit 150 is placed over the tray 108 such that the dispense pipettors 152 are aligned with the receptacle portions (e.g., reaction wells) of the tray 108. The reaction transfer and dispense unit 150 operates to dispense the reagent on the tray 108 via the dispense pipettors 152.

Referring still to FIG. 2, in some embodiments, the dispense evaluation system 104 includes an image capturing device 160 and an image processing device 162.

When the fluidic substance 110 (e.g., a mixture of the blood sample, the diluent, and the reagent in the illustrated example) is dispensed on the tray 108, the tray 108 can be conveyed to the dispense evaluation system 104. Alternatively, the dispense evaluation system 104 moves to the tray 108.

The image capturing device 160 operates to capture an image of at least a portion of the tray 108. In some embodiments, the image capturing device 160 includes a camera unit 164 and a light source 166. The camera unit 164 includes a charge-coupled device (CCD) image sensor for obtaining a color digital image. The light source 166 is used to illuminate the tray 108 to be photographed as desired. The light source 166 can be arranged in various locations. In the illustrated example, the light source 166 is positioned at the back of the tray 108 opposite to the camera unit 164. Other locations of the light source 166 are also possible.

The image processing device 162 operates to process and evaluate the image of the tray 108 captured by the image capturing device 160 to determine if the fluidic substance 110 has been appropriately dispensed on the tray 108. In some embodiments, the image processing device 162 includes at least some components illustrated in FIG. 3. An example operation of the image processing device 162 is described and illustrated with reference to FIGS. 4 and 5.

Figure 3:
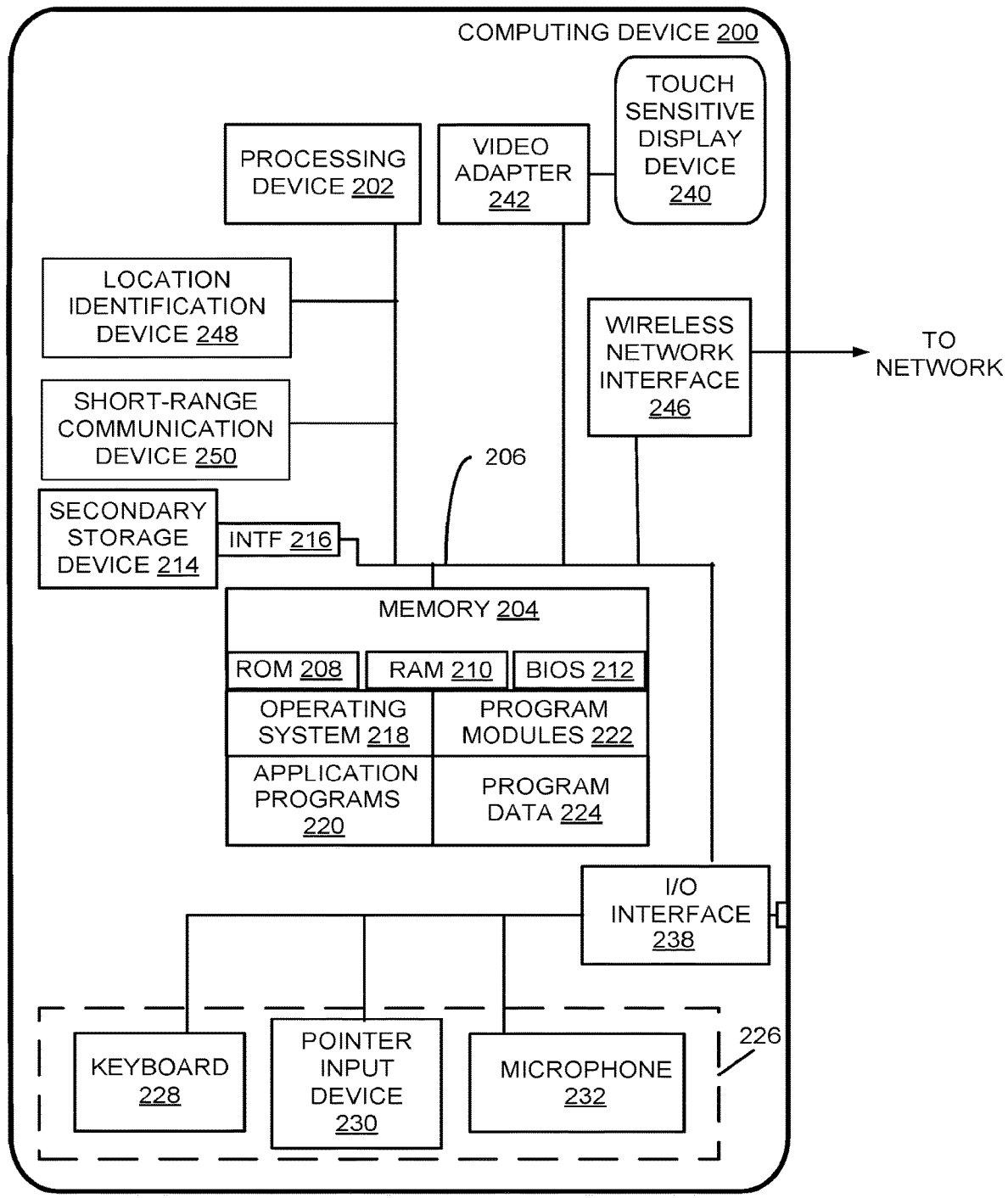
FIG. 3 illustrates an exemplary architecture of a computing device that can be used to implement aspects of the present disclosure.

FIG. 3 illustrates an exemplary architecture of a computing device that can be used to implement aspects of the present disclosure, including the biological sample analysis instrument 100 or various systems of the instrument 100, such as the substance dispense system 102, the dispense evaluation system 104, and the substance evaluation system 106. Further, one or more devices or units included the systems of the instrument 100 can also be implemented with at least some components of the computing device as illustrated in FIG. 3. Such a computing device is designated herein as reference numeral 200. The computing device 200 is used to execute the operating system, application programs, and software modules (including the software engines) described herein.

The computing device 200 includes, in some embodiments, at least one processing device 202, such as a central processing unit (CPU). A variety of processing devices are available from a variety of manufacturers, for example, Intel or Advanced Micro Devices. In this example, the computing device 200 also includes a system memory 204, and a system bus 206 that couples various system components including the system memory 204 to the processing device 202. The system bus 206 is one of any number of types of bus structures including a memory bus, or memory controller; a peripheral bus; and a local bus using any of a variety of bus architectures.

Examples of computing devices suitable for the computing device 200 include a desktop computer, a laptop computer, a tablet computer, a mobile device (such as a smart phone, an iPod® mobile digital device, or other mobile devices), or other devices configured to process digital instructions.

The system memory 204 includes read only memory 208 and random access memory 210. A basic input/output system 212 containing the basic routines that act to transfer information within computing device 200, such as during start up, is typically stored in the read only memory 208.

The computing device 200 also includes a secondary storage device 214 in some embodiments, such as a hard disk drive, for storing digital data. The secondary storage device 214 is connected to the system bus 206 by a secondary storage interface 216. The secondary storage devices and their associated computer readable media provide nonvolatile storage of computer readable instructions (including application programs and program modules), data structures, and other data for the computing device 200.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 214 or memory 204, including an operating system 218, one or more application programs 220, other program modules 222, and program data 224.

In some embodiments, computing device 200 includes input devices to enable a user to provide inputs to the computing device 200. Examples of input devices 226 include a keyboard 228, pointer input device 230, microphone 232, and touch sensitive display 240. Other embodiments include other input devices 226. The input devices are often connected to the processing device 202 through an input/output interface 238 that is coupled to the system bus 206. These input devices 226 can be connected by any number of input/output interfaces, such as a parallel port, serial port, game port, or a universal serial bus. Wireless communication between input devices and interface 238 is possible as well, and includes infrared, BLUETOOTH® wireless technology, WiFi technology (802.11a/b/g/n etc.), cellular, or other radio frequency communication systems in some possible embodiments.

In this example embodiment, a touch sensitive display device 240 is also connected to the system bus 206 via an interface, such as a video adapter 242. The touch sensitive display device 240 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 240, the computing device 200 can include various other peripheral devices (not shown), such as speakers or a printer.

The computing device 200 further includes a communication device 246 configured to establish communication across the network. In some embodiments, when used in a local area networking environment or a wide area networking environment (such as the Internet), the computing device 200 is typically connected to the network through a network interface, such as a wireless network interface 248. Other possible embodiments use other wired and/or wireless communication devices. For example, some embodiments of the computing device 200 include an Ethernet network interface, or a modem for communicating across the network. In yet other embodiments, the communication device 246 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology.

The computing device 200 typically includes at least some form of computer-readable media. Computer readable media includes any available media that can be accessed by the computing device 200. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 200.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Referring again to FIG. 3, the computing device 200 can include a location identification device 250. The location identification device 250 is configured to identify the location or geolocation of the computing device 200. The location identification device 250 can use various types of geolocating or positioning systems, such as network-based systems, handset-based systems, SIM-based systems, Wi-Fi positioning systems, and hybrid positioning systems. Network-based systems utilize service provider's network infrastructure, such as cell tower triangulation. Handset-based systems typically use the Global Positioning System (GPS). Wi-Fi positioning systems can be used when GPS is inadequate due to various causes including multipath and signal blockage indoors. Hybrid positioning systems use a combination of network-based and handset-based technologies for location determination, such as Assisted GPS.

Figure 4:
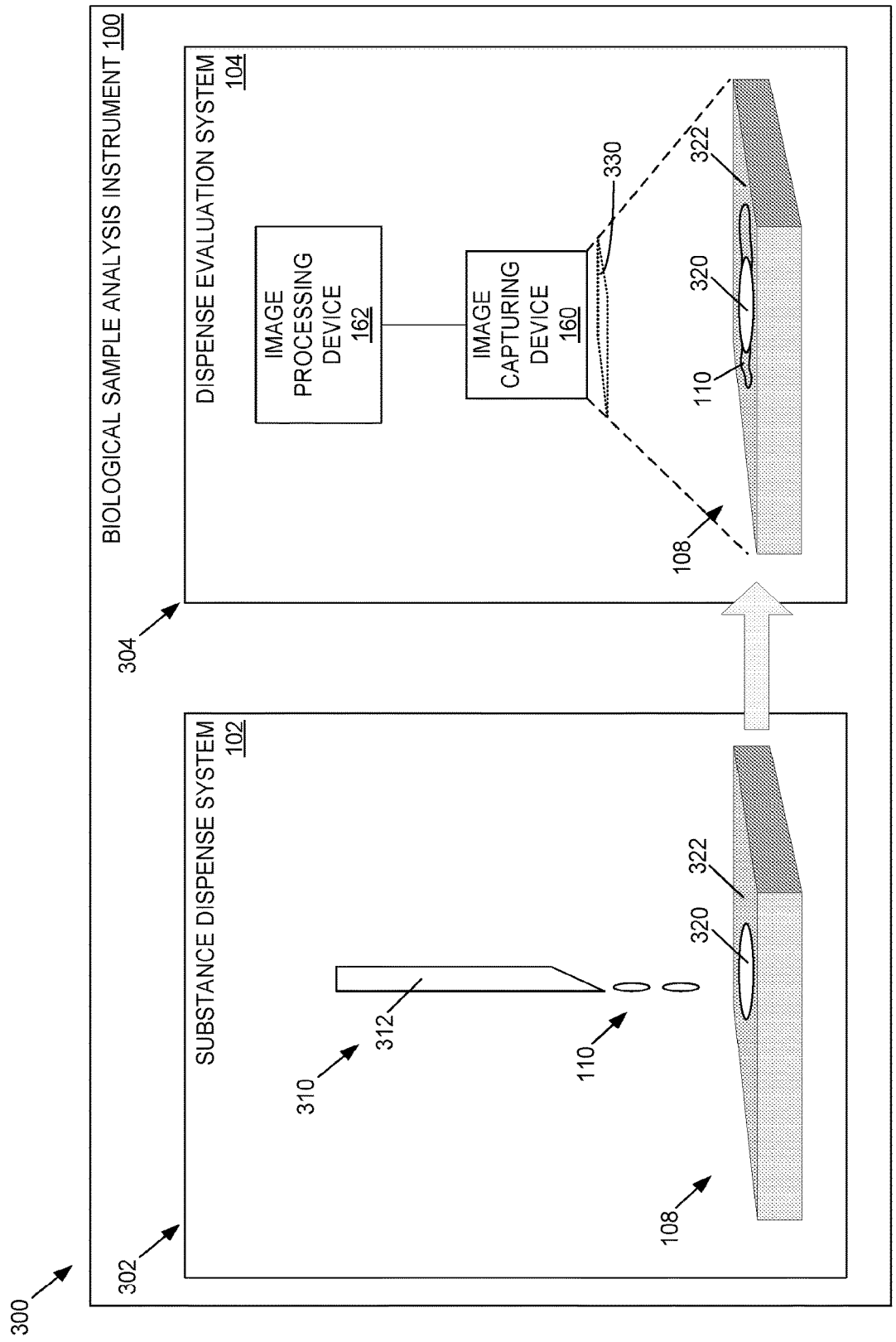
FIG. 4 schematically illustrates an example method of operating a substance dispense system and a dispense evaluation system of the biological sample analysis instrument of FIG. 1.

FIG. 4 schematically illustrates an example method 300 of operating the substance dispense system 102 and the dispense evaluation system 104 of the biological sample analysis instrument 100. An illustrative example of the tray 108 is also shown. The method 300 generally includes operations 302 and 304.

At operation 302, the substance dispense system 102 operates to dispense a fluidic substance 110 on the tray 108. The substance dispense system 102 includes a dispense device 310 having a dispense probe 312.

By way of example, the dispense device 310 can be configured as the reagent dispense system 124 (e.g., the reagent transfer and dispense unit 150). In other examples, the sample dispense system 120 (e.g., the sample aspiration unit 134) or the diluent dispense system 122 (e.g., the diluent dispense unit 142) is implemented as the dispense device 310. In yet other examples, any other dispense devices suitable for dispensing or injection a fluidic substance can be used as the dispense device 310.

In some embodiments, the dispense probe 312 is a pipettor configured to dispense the fluidic substance on the tray 108. By way of example, the dispense probe 312 can be the sample pipettor 136, a dispense tip from the diluent dispense unit 142, or the reagent dispense pipettor 152.

In some embodiments, the tray 108 includes a receptacle portion 320 and a surrounding portion 322. The receptacle portion 320 is a concave portion formed on the tray 108 and configured to receive a fluidic substance from the dispense device 310. The surrounding portion 322 is a portion of the tray 108 that is arranged around the receptacle portion 320 and not part of the receptacle portion 320. In some embodiments, the surrounding portion 322 is a surface on the tray 108 around an opening of the receptacle portion 320.

The substance dispense system 102 (e.g., the dispense device 310) is configured to ideally dispense the fluidic substance 110 only into the receptacle portion 320 of the tray 108 and not on the surrounding portion 322 or any other portion of the tray 108. However, the fluidic substance 110 can be injected or dispensed not only into the receptacle portion 320 but on the surrounding portion 322 due to various reasons. In some cases, misalignment of the dispense device 310 relative to the tray 108, and malfunction or mishandling of the system, can cause an inappropriate dispensation or spillover of the fluidic substance on the tray 108. For example, when a fluidic substance is dispensed into the receptacle portion 320 of the tray 108, the tray 108 is not properly aligned with the dispense probe 312. As a result, the dispense probe 312 can miss the receptacle portion 320 and dispense at least some of the fluidic substance onto the surrounding portion 322 of the tray 108. Such improper dispensing of the fluidic substance to the tray 108 can cause inaccurate, unreliable results at subsequent evaluation processes, such as at the substance evaluation system 106. In the illustrated example of FIG. 2, in which a blood transfusion inspection is performed, the substance evaluation system 106 cannot distinguish between a false negative agglutination pattern due to improper dispense on the tray 108 from a true negative agglutination pattern. As such, the verification that the fluidic substance has been properly dispensed on the tray is important to eliminate such false results.

Once the fluidic substance 110 is dispensed to the tray 108 by the substance dispense system 102 (at the operation 302), the tray 108 is evaluated using the dispense evaluation system 104 at operation 304. In some embodiments, the tray 108 is conveyed to the dispense evaluation system 104. In other embodiments, the tray 108 remains stationary while the dispense evaluation system 104 replaces the substance dispense system 102. The dispense evaluation system 104 can come close to the tray 108 after the substance dispense system 102 moves away from the tray 108. Alternatively, the dispense evaluation system 104 is integrally configured with the substance dispense system 102 so that the operations 302 and 304 are sequentially performed while the tray 108 is stationary.

As described above, the dispense evaluation system 104 includes the image capturing device 160 and the image processing device 162. An example of the operation 304 is described in more detail with reference to FIG. 5.

Figure 5:
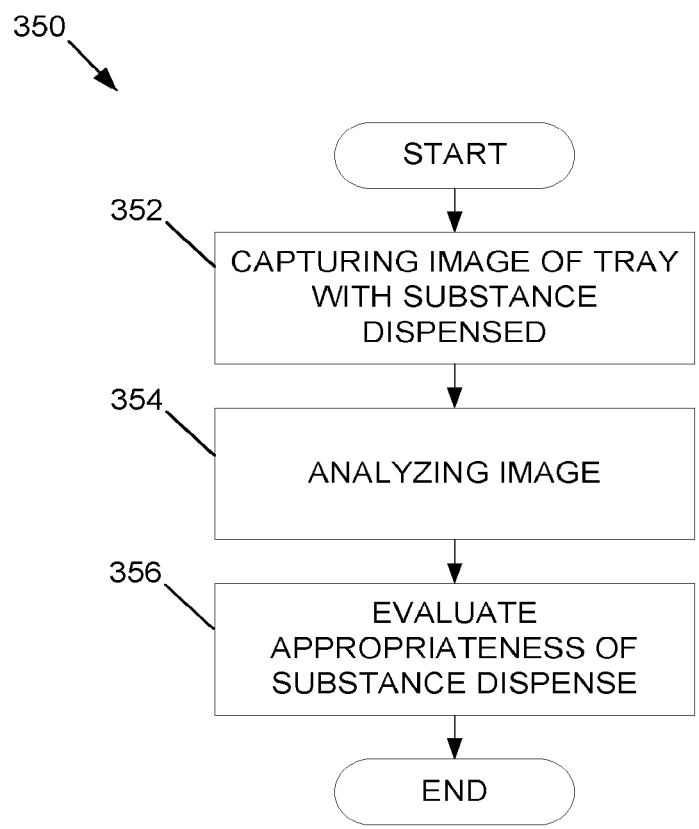
FIG. 5 is a flowchart illustrating an example method of operating the dispense evaluation system.

FIG. 5 is a flowchart illustrating an example method 350 of operating the dispense evaluation system 104 (i.e., the operation 304 in FIG. 4). In some embodiments, the method 350 includes operations 352, 354, and 356. In some embodiments, the method 350 includes operations that are performed by the dispense evaluation system 104. For example, the operations in the method 350 are executed by one or more processors, such as the processing device 202 as illustrated in FIG. 3. Although it is primarily illustrated herein that the dispense evaluation system 104 performs the operations of the method 350, at least one of the operations in the method 350 can be performed by other systems or components of the instrument 100, independently from or in cooperation with the dispense evaluation system 104.

At operation 352, the dispense evaluation system 104 operates to capture an image of the tray 108, on which the fluidic substance 110 has been dispensed as in the operation 302 of FIG. 4. In some embodiments, the image capturing device 160 is placed over the tray 108 and takes an image 330 (FIGS. 4 and 9) of at least a portion of the tray 108 such that the receptacle portion 320 and the surrounding portion 322 around the receptacle portion 320 are included in the image 330.

At operation 354, the dispense evaluation system 104 operates to analyze the image 330. In some embodiments, the image processing device 162 operates to process the image 330 and generate one or more parameters that can be used to evaluate the dispensing of the fluidic substance on the tray 108. An example of the operation 354 is described and illustrated with reference to FIG. 8.

At operation 356, the dispense evaluation system 104 operates to evaluate the appropriateness of the substance injection. In some embodiments, the image processing device 162 uses the parameters generated by analyzing the image 330 and determines if the fluidic substance has been properly dispensed on the tray 108. An example of the operation 456 is described and illustrated with reference to FIG. 8.

Figure 6:
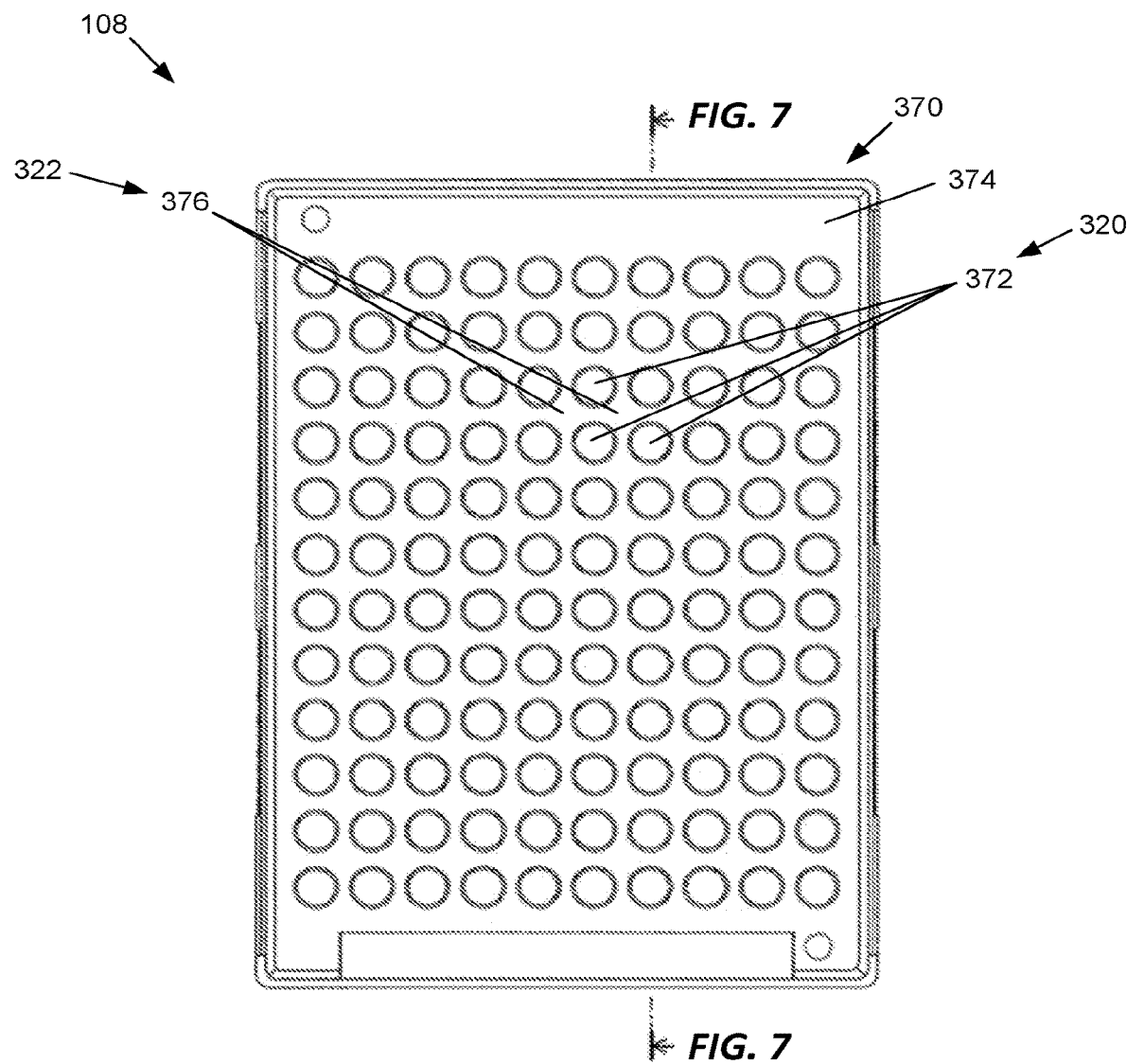
FIG. 6 is a schematic top view of an example tray.
Figure 7:
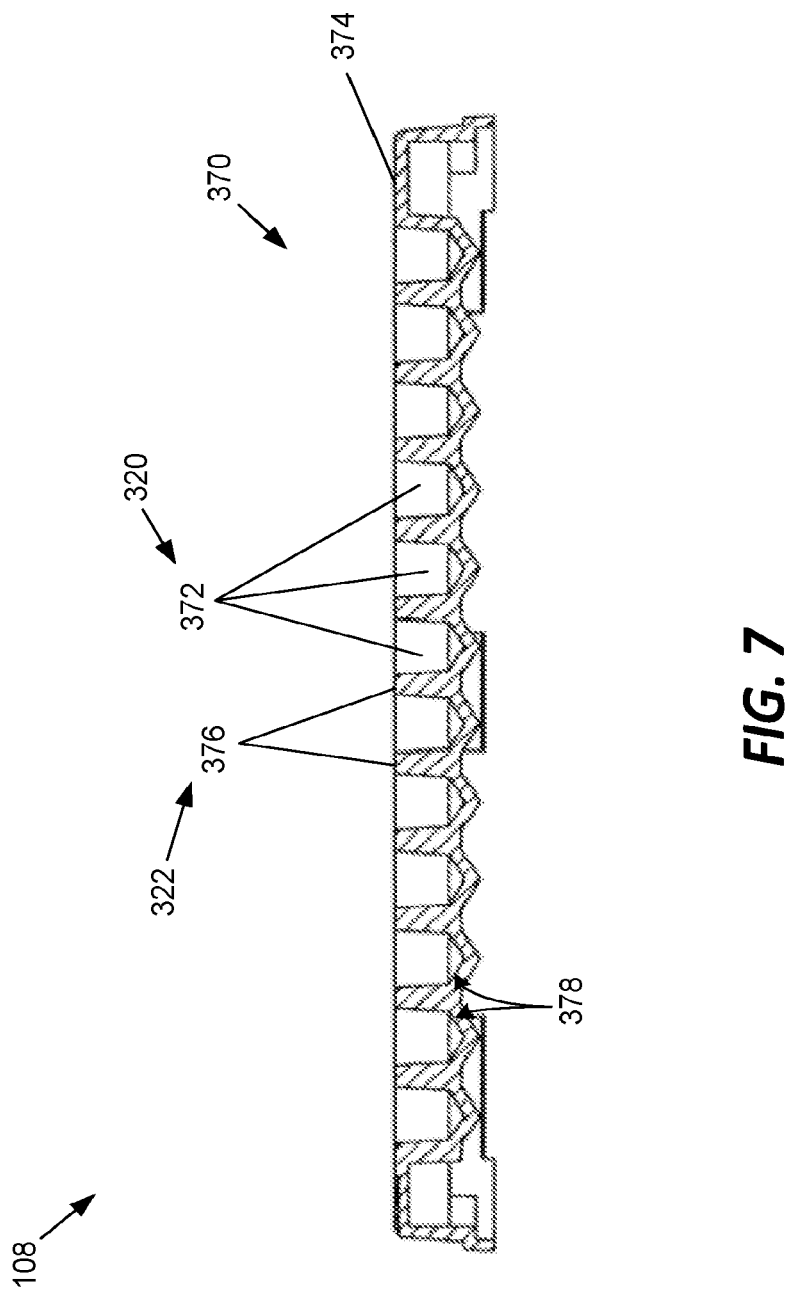
FIG. 7 is a cross sectional side view of the tray of FIG. 6.

With reference to FIGS. 6 and 7, an example of the tray 108 is described. In particular, FIG. 6 is a schematic top view of an example tray 108, and FIG. 7 is a cross sectional side view of the tray 108 of FIG. 6.

In the illustrated example, the tray 108 is configured as a microplate 370. The microplate 370 includes a plurality of wells 372 that provide reaction vessels to analyze components of a fluidic substance (e.g., a specimen). The wells 372 have circular openings that are formed on a dispensation surface 374 of the microplate 370, and a surrounding portion or surface 376 is defined as the dispensation surface 374 surrounding the openings of the wells 372. In some embodiments, the wells 372 are formed in a substantially concave shape and arranged in matrix on the dispensation surface 374 of the microplate 370. As such, the wells 372 of the microplate 370 correspond to the receptacle portion 320 of the tray 108, and the surrounding surface 376 of the microplate 370 corresponds to the surrounding portion 322 of the tray 108. In some embodiments, the microplate 370 is formed by injection molding synthetic resin such as acrylic.

In some embodiments, each well 372 of the microplate 370 is configured to receive a specimen to be tested and a reaction reagent that causes an antigen-antibody reaction with the specimen. After a predetermined time from this dispensation, at least a portion of the microplate 370 with the reaction caused in the wells 372 is imaged by the image capturing device 160 and the dispensation is analyzed with the captured image as described herein.

As illustrated in FIG. 7, any cross-section (a horizontal cross-section as taken along line A-A) that is parallel to the opening plane (i.e., the dispensation surface 374) of the well 372 is circle, and a diameter of the circle on each horizontal cross-section becomes smaller gradually toward a bottom from the opening plane. In particular, a bottom 378 serving as a liquid containing basin at the time of dispensation is in a substantially circular conic shape. In some embodiments, an included portion in the bottom 378 has such a configuration that a diameter thereof changes slightly stepwise to increase surface area thereof so that precipitation of a reactant condensed as a result of an antigen-antibody reaction is facilitated.

By way of example, when a specimen, such as blood and body fluid, and a reagent including a substance that causes a specific reaction with a certain substance in the specimen, are respectively dispensed for an appropriate amount in the wells 372 of the microplate 370, the substances causes an antigen-antibody reaction inside the wells 372 of the microplate 370. For example, when blood typing is performed using red corpuscles in blood, the red corpuscles causes an antigen-antibody reaction with a certain antibody included in a reagent to be agglutinated. The agglutinated red corpuscles precipitate at the inclined portion in steps of the bottom 378. The agglutination pattern formed by the precipitation differs depending on a blood type, and therefore, by analyzing image data that is obtained by imaging the agglutination pattern by an appropriate imaging means, the blood type of the specimen is determined. Because the agglutination pattern obtained by the antigen-antibody reaction appears at the inclination portion of the bottom 378 of the well 372, to image this condensation pattern, it is required to take the focus position of the imaging means near the bottom 378.

Figure 8:
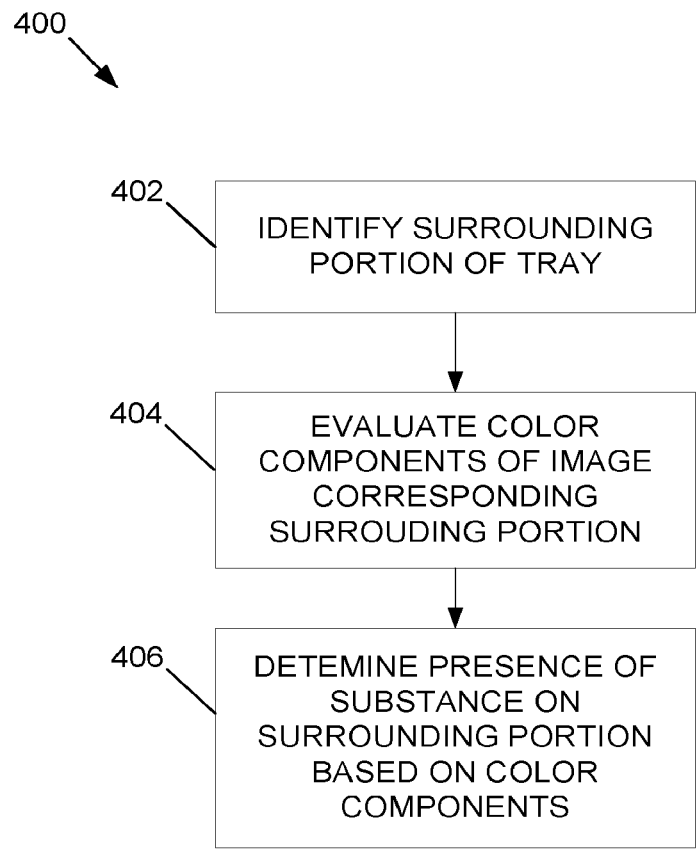
FIG. 8 is a flowchart illustrating an example method of operating the dispense evaluation system.
Figure 9:
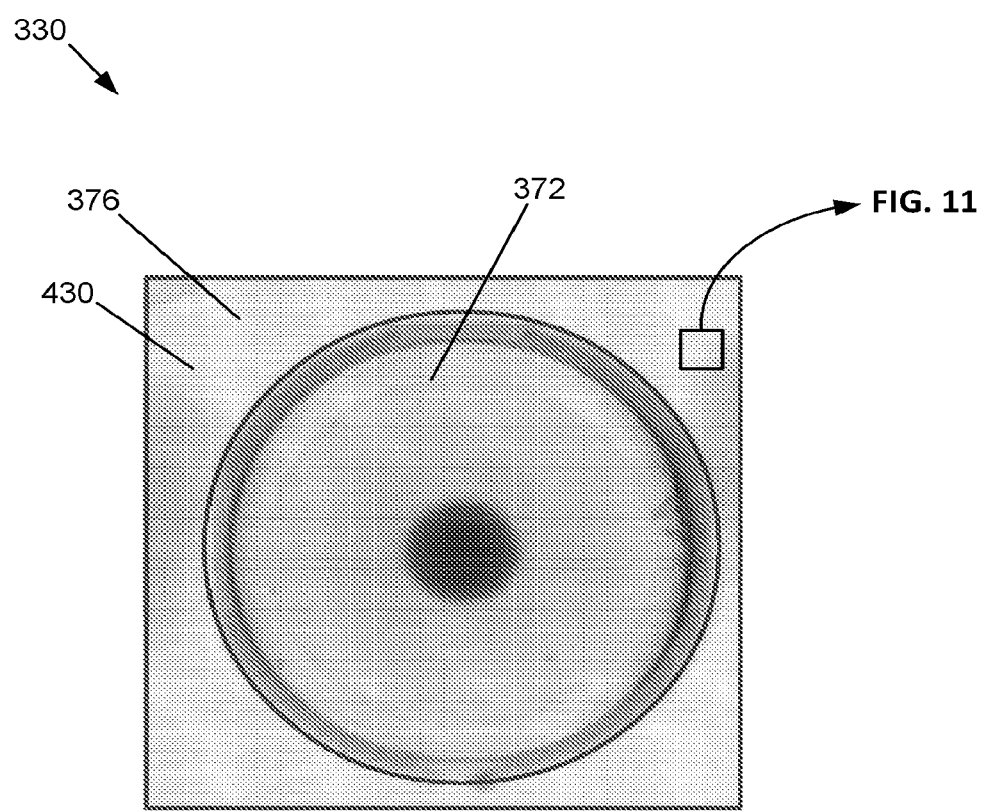
FIG. 9 illustrates an example image of a portion of a microplate.

Referring to FIGS. 8 and 9, an example method 400 of operating the dispense evaluation system 104 is described in more detail. FIG. 8 is a flowchart illustrating an example method 400 of operating the dispense evaluation system 104. The method 400 is described with also reference to FIG. 9, which illustrates an example image 330 of a portion of the microplate 370.

The method 400 includes operations that can be executed by the image processing device 162 of the dispense evaluation system 104. In some embodiments, the operation 354 as described in FIG. 5 is implemented in the method 400. In the illustrated embodiment, the method 400 includes operations 402, 404, and 406.

The method 400 is performed once an image 330 of at least a portion of the tray 108 is captured by the image capturing device 160. Prior to the method 400, the tray 108 is imaged by the image capturing device 160 as illustrated in FIG. 4 (e.g., the operation 352 as shown in FIG. 5). The image capturing device 160 can capture an image 330 of at least a portion of the tray 108 such that the image 330 includes one or more receptacle portion 320 and a surrounding portion 322 around the receptacle portions 320.

In the present disclosure, the method 400 is primarily described with the microplate 370 as the tray 108, which includes a plurality of receptacle portions 320 (e.g., a plurality of wells 372) and a plurality of surrounding portions 322 (e.g., a plurality of surrounding portions 376). In the illustrated embodiment, the image capturing device 160 operates to take an image 330 of a portion of the tray 108 such that the image includes only one receptacle portion 320 (e.g., a single well 372) and a surrounding portion 322 (e.g., a single surrounding portion 376) around the receptacle portion 320. To evaluate the entire tray 108 in this configuration, a plurality of images are taken for different portions of the tray 108 such that the plurality of images in combination can represent the entire tray 108 (e.g., the microplate 370). As described herein, each of the images can be processed and analyzed for evaluating the appropriateness of dispensation of a fluidic substance.

In other embodiments, the image capturing device 160 captures an image of a portion of the tray 108 such that the image includes two or more receptacle portions and surrounding portions associated with the receptacle portions. In this configuration, the image capturing device 160 needs to capture a plurality of such images if the entire tray 108 is to be evaluated.

Alternatively, the tray 108 (e.g., the microplate 370) can be imaged in different manners for executing the method 400. Where the tray 108 includes a single receptacle portion 320 and a surrounding portion 322 around the receptacle portion 320, the image 330 is captured to include the receptacle portion 320 and at least a part of the surrounding portion 322. Where the tray 108 includes a plurality of receptacle portions 320 and a plurality of surrounding portions 322 (e.g., where the tray 108 is a microplate 370), the image capturing device 160 can capture an image of the entire tray 108 at once so that the image includes the plurality of receptacle portions and the plurality of surrounding portions. In subsequent processes, the image of the entire tray can be divided into a plurality of pieces (also referred to herein as sub-images), each of which is subjected to image evaluation as described herein. Each piece of the image can include at least one of the receptacle portions and at least one of the surrounding portions that is around the one of the receptacle portions. In other embodiments, each piece of the image can include two or more of the receptacle portions and two or more of the surrounding portions that are around the two or more of the receptacle portions.

In yet other embodiments, a predetermined region of the tray 108 is imaged and evaluated to determine the appropriateness of dispensation for the entire tray 108 or for that region of the tray 108.

Referring still to FIG. 8, at operation 402, the image processing device 162 identifies the surrounding portion 322 around the receptacle portion 320 of the tray 108 in the image 330. The image 330 can be analyzed using various image processing techniques to identify a portion of the image 330 that corresponds to the surrounding portion 322 of the tray 108. In the illustrated example of FIG. 9, the image 330 represents a portion of the microplate 370 that includes one well 372 and a surrounding portion 376 around the well 372. In some embodiments, a surrounding image portion 430 of the image 330 that corresponds to the surrounding portion 376 around the well 372 can be identified using edge detection, in which a boundary of the well 372 is found in the image 330. For example, discontinuities in brightness can be detected in the image 330 to find the boundary of the well 372. Other techniques can be used to identify the surrounding image portion 430 of the image 330, which corresponds to the surrounding portion 376 around the well 372.

At operation 404, the image processing device 162 evaluates color components of the surrounding image portion 430 of the image 330. Such color components can be obtained from signals outputted the image capturing device 160. The color components can be associated different color components depending on different color models. For example, in the RGB color model, the color components include red, green, and blue components. In the CMYK color model, the color components include cyan, magenta, yellow, and black. Other combinations of color components are also possible in other embodiments. An example of the operation 404 is described in more detail with reference to FIG. 10.

At operation 406, the image processing device 162 determines whether the fluidic substance 110 is present on the surrounding portion 376 around the well 372 of the microplate 370. In some embodiments, the determination is made based on at least one of the color components of the surrounding image portion 430 of the image 330. An example of the operation 404 is described in more detail with reference to FIG. 10.

Figure 10:
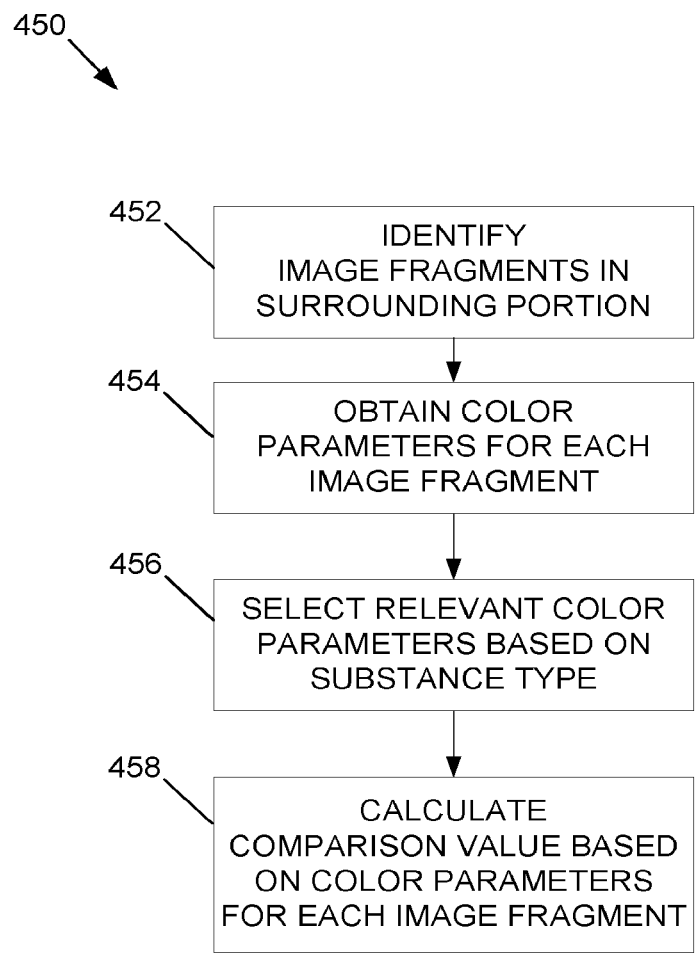
FIG. 10 is a flowchart illustrating an example method of performing operations of FIG. 8.

FIG. 10 is a flowchart illustrating an example method 450 of performing some of the operations in the method 400 of FIG. 8. The method 450 is described with further reference to FIG. 11, which schematically illustrates a portion of the image 330 of FIG. 9. In some embodiments, an example method 450 implements the operations 404 and 406. The method 450 can include operations 452, 454, 456, and 458.

Figure 11:
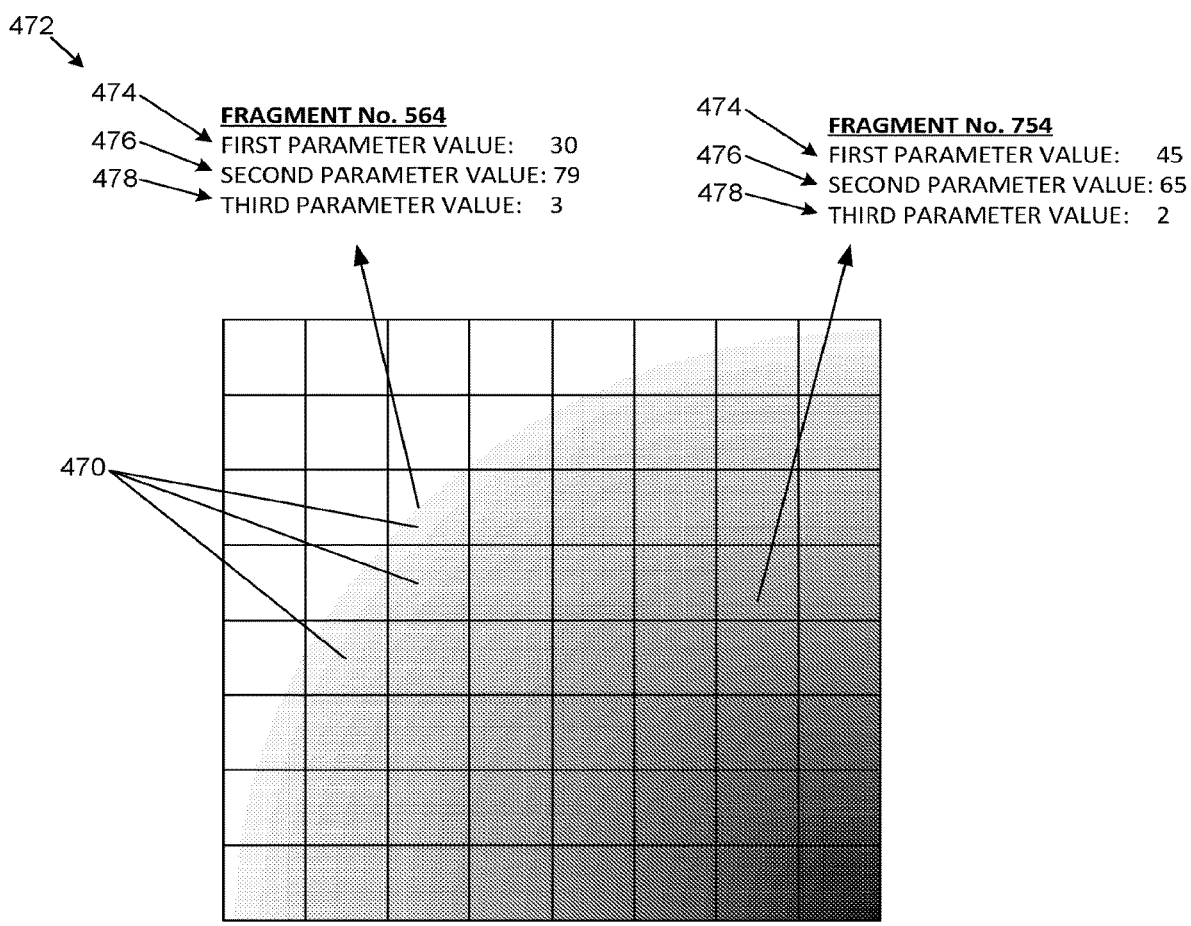
FIG. 11 schematically illustrates a portion of the image of FIG. 9.

At operation 452, the image processing device 162 identifies a plurality of image fragments 470 in the surrounding image portion 430 of the image 330. As illustrated in FIG. 11, the surrounding image portion 430 of the image 330 can be divided into a plurality of image fragments 470 for subsequent analysis. In some embodiments, the image fragments 470 correspond to pixels of the image 330. The image fragments 470 can be identified in various manners. In some embodiments, the image fragments 470 are numbered for identification. In the illustrated embodiment of FIG. 11, one of the image fragments is identified by a serial number "564" and another image fragment is identified by a serial number "754."

At operation 454, the image processing device 162 obtains color parameters 472 for each of the image fragments 470. In the illustrated embodiment, three color parameters (i.e., first, second, and third color parameters 474, 476, and 478 in FIG. 11) are obtained for each image fragment 470. The color parameters are measured by various manners. In some embodiments, the values of color components are be scaled, for example from 0 to 99. By way of example, in FIG. 11, the image fragment identified by "564" has a first color parameter value of 30, a second parameter value of 79, and a third parameter value of 3, and the image fragment identified by "754" has a first color parameter value of 45, a second parameter value of 65, and a third parameter value of 2.

In some embodiments, the three color parameters 474, 476, and 478 are determined from color components based on various color models. For example, the color parameters 474, 476, and 478 are the values of red, green, and blue components in the RGB color model. Other types and numbers of color parameters can be obtained in other embodiments. For example, in the CMYK color model, four color components, such as cyan, magenta, yellow, and black components, can be used. An example set of color parameter data for color fragments is illustrated in FIG. 12.

At operation 456, the image processing device 162 selects one or more of the color parameters 472 based on the type of the fluidic substance 110 dispensed on the tray 108. In the illustrated embodiments, two color parameters are selected from the three color parameters 472 depending on the characteristics of the fluidic substance 110. An example selection of color parameters (i.e., a parameter selection 494) is illustrated in FIG. 13.

At operation 458, the image processing device 162 calculates a comparison value 502 (FIG. 14) based on the selected color parameters for each of the image fragments 470. Some examples of the comparison value 502 are described and illustrated in more detail with reference to FIG. 14.

FIG. 12 illustrates an example data set 480 that includes the values of the color parameters 472 representative of each image fragment 470. By way of example, the first, second, and third color parameters 474, 476, and 478 are the values of red, green, and blue components in each pixel within the surrounding image portion 430 of the image 330. In the illustrated embodiments, the surrounding image portion 430 of the image 330 includes 130,569 pixels, each of which has the values of three different color parameters.

FIG. 13 illustrates an example data set 490 in which two color parameters (e.g., a parameter selection 494) are selected from the three color parameters based on the type of fluidic substance dispensed on the tray 108. In the illustrated example where a blood sample is tested, the substance type 492 can be determined by either or both of the blood sample type and the reagent type.

In some embodiments, the color parameters 472 are selected such that one of the selected color parameters closely matches the color of the fluidic substance and the other color parameter is different from the color of the fluidic substance. In the illustrated example of FIG. 13, when the fluidic substance is a mixture of red blood cells and the first type of reagent ("Reagent 1"), the first and second color parameters 474 and 476 are selected for dispensation evaluation. One of the first and second color parameters 474 and 476 can be selected so as to match the color of the mixture of red blood cells and Reagent 1 as closely as possible, and the other color parameter has a color that is as different as possible. For example, the other color parameter can be selected to be complementary to the color of the fluid substance. By way of example, where the RGB color model is used to analyze the image 330, a red color parameter is selected as a first color parameter when red blood cells are used as a blood sample (because the color of red blood cells is red), and either a green color parameter or a blue color parameter can be chosen as a second color parameter. When a blood sample is blood plasma, which is substantially yellow, a green color parameter can be used as a first color parameter that closely matches the color of the blood sample, and either a red color parameter or a blue color parameter can be selected as a second color parameter that is far from the color of the blood sample. In other examples, the color of a reagent used can be referred to in selecting the color parameters. For examples, where the reagent is green, a green color parameter is used as a first color parameter, and either a red color parameter or a blue color parameter is selected as a second color parameter.

Figure 14:
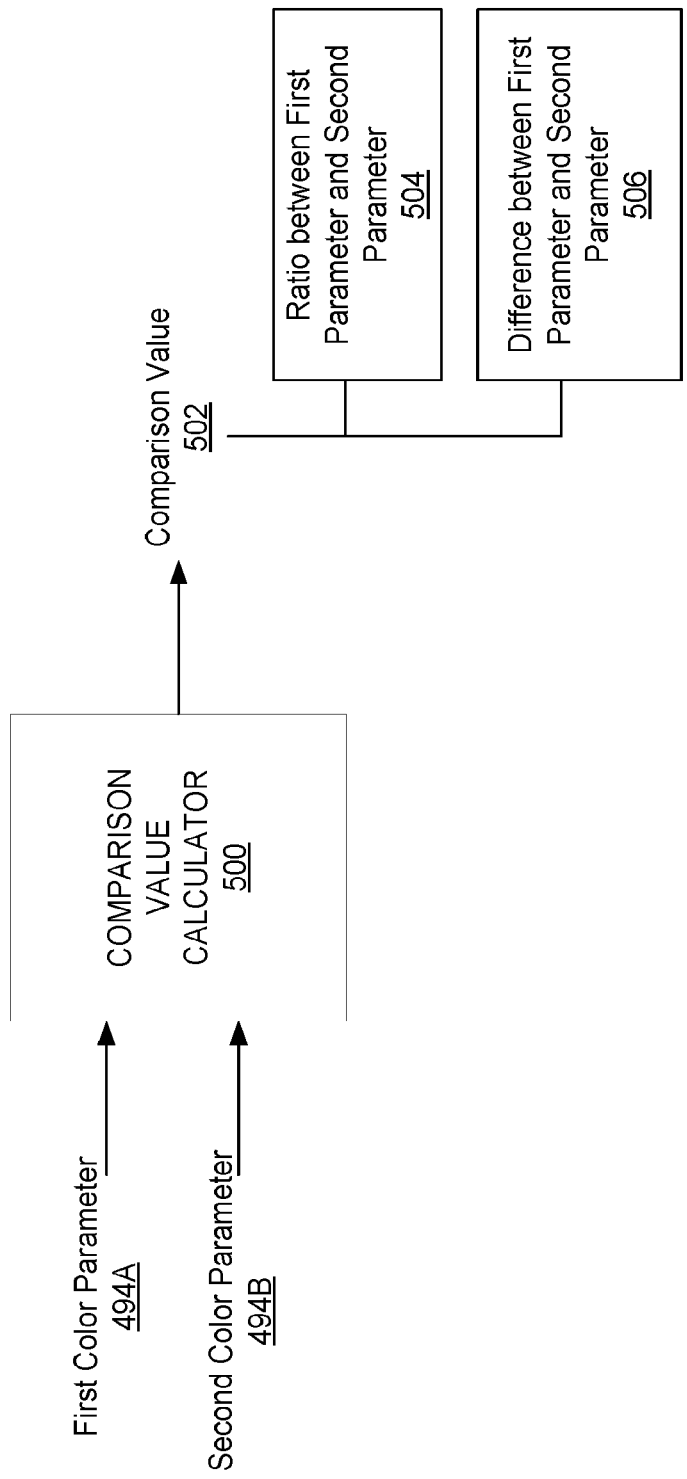
FIG. 14 is a block diagram of an example comparison value calculator for generating a comparison value.

FIG. 14 is a block diagram of an example comparison value calculator 500 for generating a comparison value 502. In some embodiments, the comparison value calculator 500 receives the color parameters (i.e., the selected color parameters 494) selected based on the type of fluidic substance dispensed on the tray 108, and generates a comparison value 502 suitable for evaluating the substance dispensation on the tray 108.

The comparison value 502 is a function of the selected color parameters 494. In the illustrated embodiment, two color parameters, such as the first and second color parameters 494A and 494B, are used as variables for the comparison value 502. In some embodiments, the comparison value 502 includes a ratio 504 between the first and second color parameters 494A and 494B. In other embodiments, the comparison value 502 includes a difference 506 between the first and second color parameters 494A and 494B. In yet other embodiments, the comparison value 502 includes other values associated with the selected color parameters 494.

Figure 15:
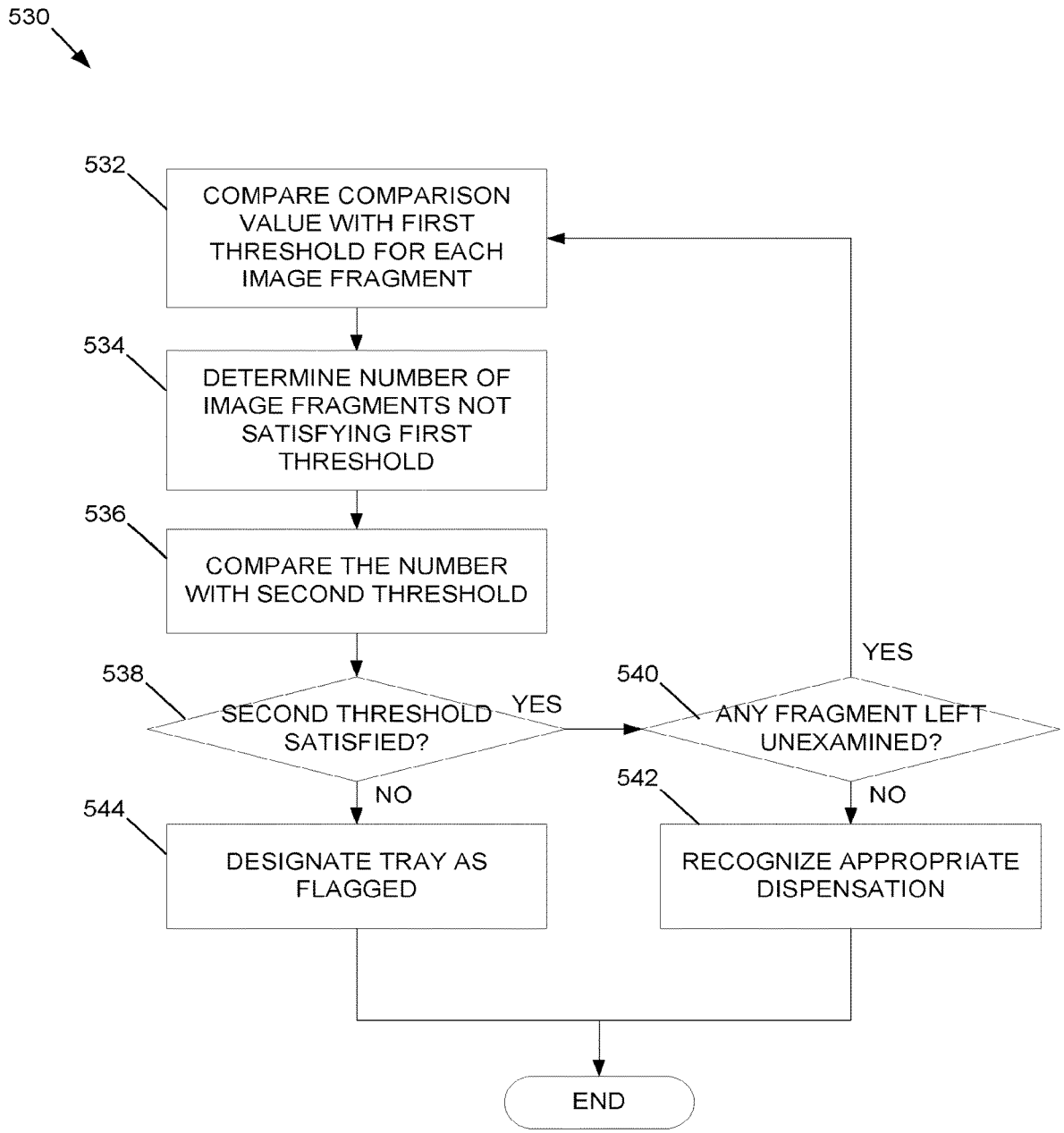
FIG. 15 is a flowchart illustrating an example method of operating the dispense evaluation system.

FIG. 15 is a flowchart illustrating an example method 530 of operating the dispense evaluation system 104. In particular, the method 530 includes operations that can be executed by the image processing device 162 of the dispense evaluation system 104. In some embodiments, the operation 356 as described in FIG. 5 is implemented in the method 530. In the illustrated embodiment, the method 530 includes operations 532, 534, 536, 538, 540, 542, and 544. The method 530 is described with further reference to FIGS. 16 and 17.

At operation 532, the image processing device 162 compares the comparison value 520 with a first threshold 552 for each image fragment 470. The first threshold 552 provides a reference value for evaluating the image fragments 470.

Referring again to FIG. 13, a plurality of first thresholds 552 are provided. The first threshold 552 varies in accordance with the type of substance dispensed on the tray 108. In some embodiments, a set of first thresholds 552 are experimentally determined so as to improve the accuracy and reliability in the substance dispensation evaluation result. Further, the first threshold 552 is provided differently for the type of comparison value 502. For example, the first threshold 552A is adapted for the ratio comparison value 504, and the first threshold 552B is provided for the difference comparison value 506. One example set of first thresholds is described with reference to FIG. 19.

Referring back to FIG. 15, at operation 534, the image processing device 162 determines the number of image fragments 470 that do not satisfy the first threshold 552. For each image fragment 470, it is determined whether the comparison value 502 does not satisfy the first threshold 552. If the comparison value 502 for a particular image fragment does not meet the first threshold 552, that image fragment can be designated as a counted image fragment. Once such determination is made for all of the image fragments under evaluation, the total number of the image fragments 470 not satisfying the first threshold 552 is obtained for the entire image fragments 470 subjected to the dispensation evaluation. In the present disclosure, the total number of such unsatisfactory image fragments can be referred to as a total number of counted image fragments. In some embodiments, only a portion of the entire image fragments 470 are analyzed to generate the total number of counted image fragments.

Figure 16:
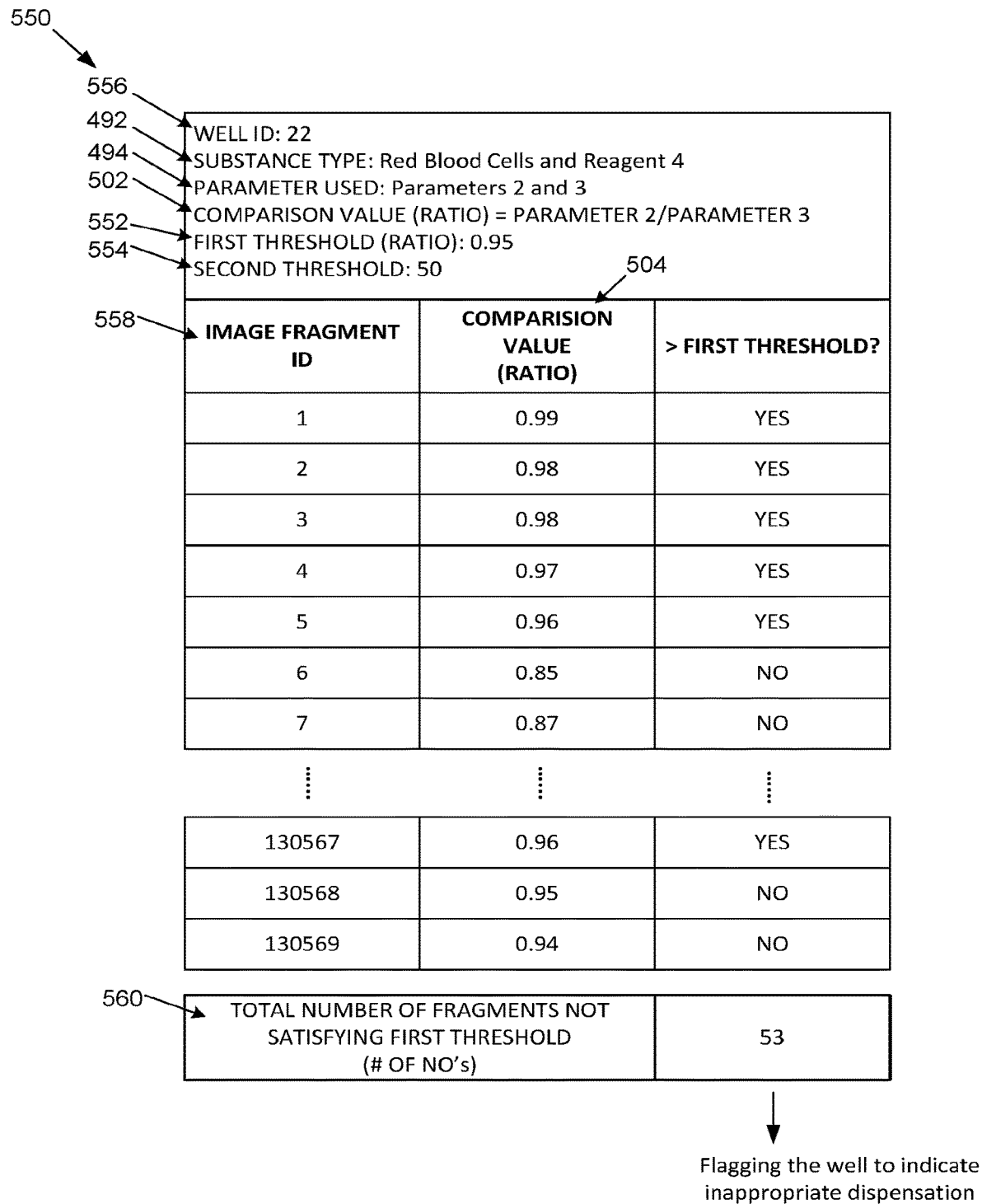
FIG. 16 illustrates example data associated with each image captured and analyzed.
Figure 17:
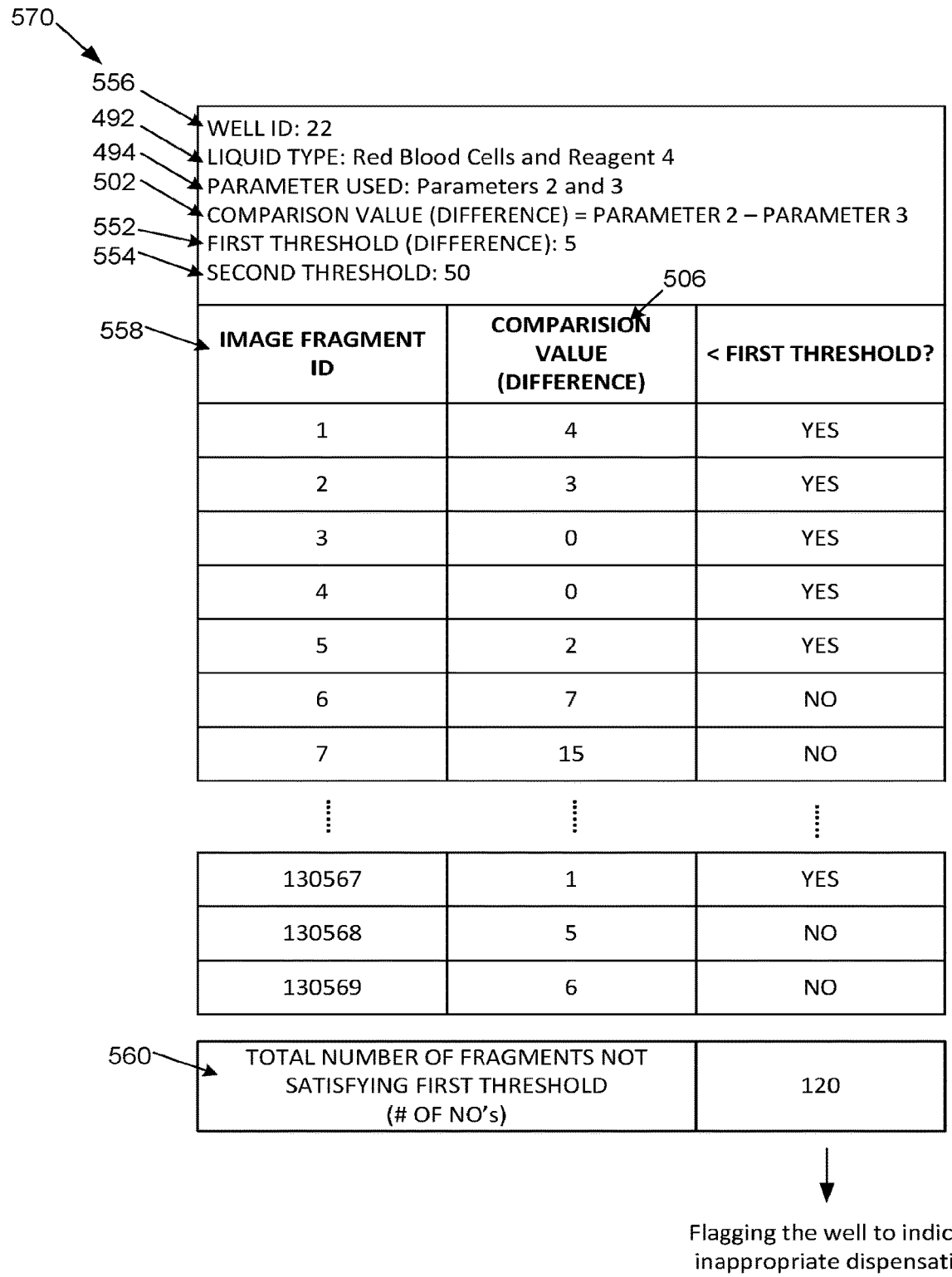
FIG. 17 is another example data associated with each image captured and analyzed.

In some embodiments, the comparison value 502 does not meet the first threshold 552 if the comparison value 502 exceeds the first threshold 552 (e.g., in FIG. 17). In other embodiments, the comparison value 502 does not satisfy the first threshold 552 if the comparison value 502 is smaller than the first threshold 552 (e.g., in FIG. 16).

At operation 536, the image processing device 162 compares the total number of counted image fragments with a second threshold 554. The second threshold 554 provides a reference value for determining if there has been a spillover of the fluidic substance dispensed on the tray 108. In the present disclosure, the second threshold 554 can be referred to as a cutoff value. As described below, if the number of image fragments that do not meet the first threshold 552 exceeds the cutoff value, it is considered that the fluidic substance has spilled on the surrounding portion around the receptacle portion of the tray. One example set of second thresholds is described with reference to FIG. 19.

At operation 538, the image processing device 162 determines whether the total number of counted image fragments satisfies the second threshold 554. In some embodiments, the total number of counted image fragments meets the second threshold 554 if the total number of counted image fragments is smaller than the second threshold 554. In other embodiments, the total number of counted image fragments meets the second threshold 554 if the total number of counted image fragments is not greater than the second threshold 554.

If it is determined that the total number of counted image fragments satisfies the second threshold 554 ("YES" at the operation 538), the method 530 moves on to operation 540. Otherwise ("NO" at the operation 538), the method 530 continues to operation 544.

At operation 540, the image processing device 162 determines whether there are any image fragments 470 that have not been evaluated through the operations 532, 534, 536, and 538. If any image fragment 470 is found unexamined ("YES" at the operation 540), the method 530 returns to the operation 532 and the subsequent operations that are performed for the unexamined image fragments. If there is no image fragment 470 unexamined ("NO" at the operation 540), the method 530 continues to operation 542.

At operation 542, the image processing device 162 recognizes that the fluidic substance has been appropriately dispensed on the tray 108. In some embodiments, the image processing device 162 operates to store information representative of such appropriate dispensation. For example, the image processing device 162 can update data associated with the tray 108 to include information that the fluidic substance has been properly dispensed on the tray 108 for further analysis. In other embodiments, the image processing device 162 terminates the dispensation evaluation process without performing any other operation. This can indicate the appropriateness of dispensation as opposed to flagging at the operation 544.

At operation 544, the image processing device 162 operates to designate the tray 108 as flagged. In some embodiments, the image processing device 162 stores a flag indicative of inappropriate dispensation of the fluidic substance on the tray 108. The flag associated with the tray 108 represents an inappropriate dispensation of the fluidic substance on the tray 108.

FIG. 16 illustrates example data 550 associated with each image 330 captured and analyzed as described herein. In some embodiments, the data 550 represent the image fragment analysis for an image of at least a portion of the tray, as shown in some of the operations of FIG. 15. In the illustrate example, the image was captured for each well 372 of the microplate 370, and a plurality of image fragments 470 of the image, which represent a surrounding portion 376 around that well 372 within the image, are evaluated.

In some embodiments, the data 550 includes a well ID 556 to identify the well 372 of the microplate 370, which has been analyzed to dispensation evaluation. The data 550 can include various pieces of information that are associated with the analysis, such as the type of substance dispensed on the microplate (i.e., the substance type 492), the color parameters 494 used for analysis, the comparison value 502 used for analysis, the first threshold 552 used for analysis, and the second threshold 554 used for analysis.

As illustrated, the data 550 can identify the plurality of image fragments within the image by image fragment IDs 558. For each image fragment 470, the comparison value 502 is calculated based on the type of comparison value defined for the analysis. In the illustrated example, the ratio comparison value 504 is used and defined as a ratio of the second color parameter over the third color parameter. The ratio comparison value 504 is calculated for each image fragment 470 and associated with an image fragment ID 558 for that image fragment 470. The data 550 further include information as to whether the ratio comparison value 504 exceeds the first threshold 552. Moreover, the data 550 include the total number of image fragments that do not satisfy the first threshold (i.e., the total number of counted image fragments 560). In this case, the image fragments having comparison values that do not exceed the first threshold are counted into the total number of counted image fragments 560.

In some embodiments, the data 550 further include information as to whether the total number of counted image fragments 560 exceeds the second threshold 554. In the illustrated example, the total number of counted image fragments 560 (e.g., 53 in FIG. 16) exceeds the second threshold 554 (e.g., 50 in FIG. 16). In this case, the well 372 of the microplate 370 associated with the data 550 can be flagged to indicate an inappropriate dispensation of the fluidic substance on the well 372.

FIG. 17 is another example data 570 associated with each image 330 captured and analyzed as described herein. The data 570 are similar to the data 550 of FIG. 17 except for the type of comparison value 502 used for analysis.

In some embodiments, the data 570 represent the image fragment analysis for an image of at least a portion of the tray, as shown in some of the operations of FIG. 15. In the illustrate example, the image was captured for each well 372 of the microplate 370, and a plurality of image fragments 470 of the image, which represent a surrounding portion 376 around that well 372 within the image, are evaluated.

Similarly to the data 550, the data 570 can include information about the well ID 556, the substance type 492), the color parameters 494 used for analysis, the comparison value 502 used for analysis, the first threshold 552 used for analysis, and the second threshold 554 used for analysis.

As illustrated, the data 570 can identify the plurality of image fragments within the image by image fragment IDs 558. For each image fragment 470, the comparison value 502 is calculated based on the type of comparison value defined for the analysis. In the illustrated example, the difference comparison value 506 is used and defined as the difference between the second color parameter and the third color parameter. The difference comparison value 506 is calculated for each image fragment 470 and associated with an image fragment ID 558 for that image fragment 470. The data 570 further include information as to whether the difference comparison value 506 is smaller than the first threshold 552. Moreover, the data 570 include the total number of image fragments that do not satisfy the first threshold (i.e., the total number of counted image fragments 560). In this case, the image fragments having comparison values that are equal to or exceed the first threshold are counted into the total number of counted image fragments 560.

In some embodiments, the data 570 further include information as to whether the total number of counted image fragments 560 exceeds the second threshold 554. In the illustrated example, the total number of counted image fragments 560 exceeds the second threshold 554. In this case, the well 372 of the microplate 370 associated with the data 570 can be flagged to indicate an inappropriate dispensation of the fluidic substance on the well 372.

Figure 18:
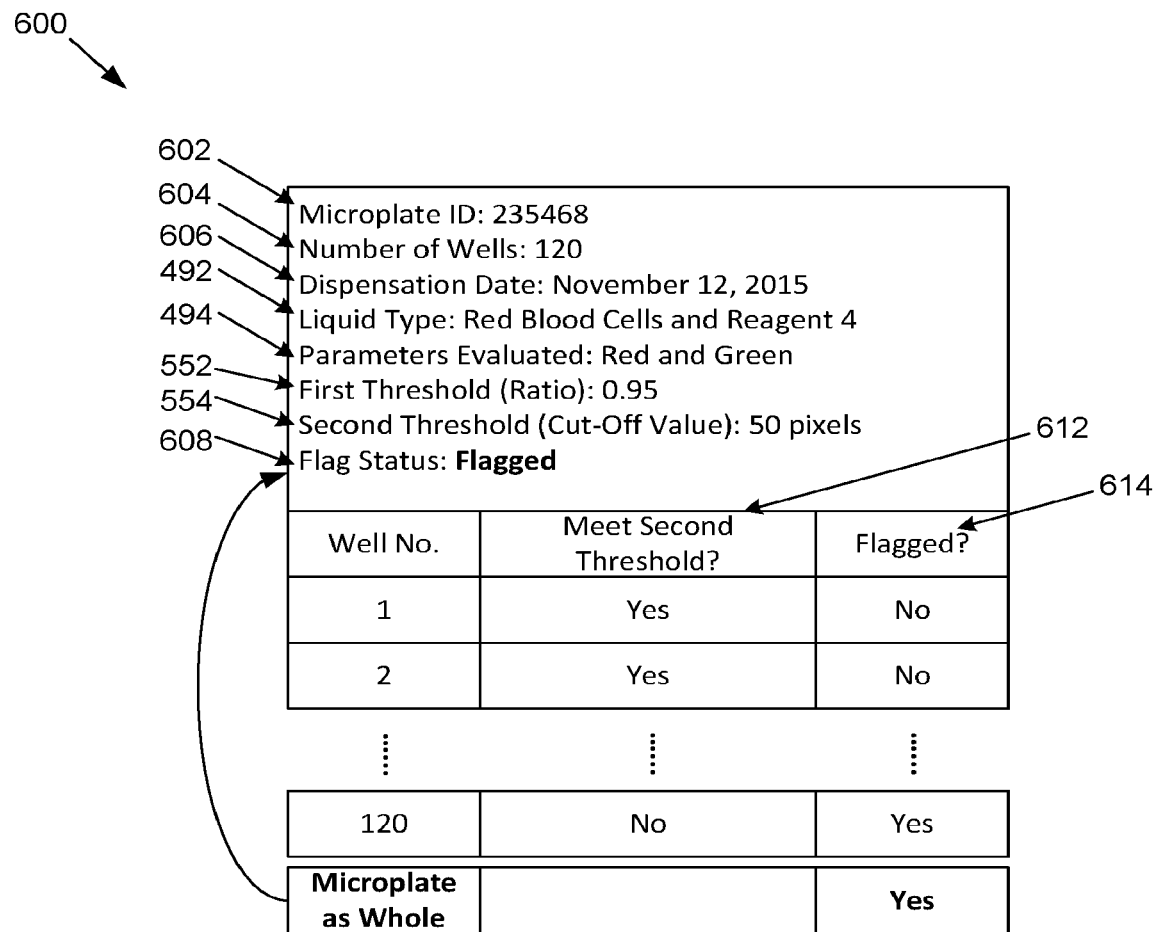
FIG. 18 is an example set of data generated as a result of dispensation evaluation.

FIG. 18 is an example set of data 600 that is generated as a result of the dispensation evaluation for a tray 108. In the illustrated example, the tray 108 is a microplate 370 including a plurality of wells 372. In some embodiments, the data 600 include a microplate ID 602, which is used to identify the microplate 370 on which the fluidic substance has been dispensed. The data 600 can further include information about the number of wells included in the microplate (i.e., the number of wells 604), a dispensation date 606, the type of substance dispensed on the microplate (i.e., the substance type 492), the color parameters 494 used for analysis, the comparison value 502 used for analysis, the first threshold 552 used for analysis, and the second threshold 554 used for analysis. Further, the data 600 includes a flag status 608. In other embodiments, other pieces of information are included in the data 600.

As illustrated, the data 600 include information 612 as to whether the second threshold 554 was satisfied for each well 372. As described above, the well 372 that does not meet the second threshold 554 can be flagged as indicating an inappropriate dispensation on that well 372. Such information 614 is also included in the data 600, as illustrated in the third column of the table.

The appropriateness of dispensation on the microplate 370 as a whole is determined based on the flagging results of the wells 372 of the microplate 370. The microplate 370 is flagged to indicate that the fluidic substance has not been properly dispensed on the microplate 370 and, thus, is not ready for further analysis. The flag status 608 is used to indicate whether the microplate 370 is flagged or not. In some embodiments, the microplate 370 is determined as flagged if any of the wells 372 is flagged. In other embodiments, the microplate 370 is regarded as flagged if a predetermined number of the wells 372 are flagged.

The flag status 608 is presented to a user of the instrument 100 in various manners. In some embodiments, the flag status 608 is displayed on a screen provided on the instrument 100 to inform the user of the appropriateness of dispensation (and thus the readiness for further analysis). In other embodiments, the flag status 608 is included in a report that can be displayed or printed out for the user. In yet other embodiments, at least part of the data 600 is displayed or printed out for the user's reference.

As described herein, in an exemplary embodiment of the present disclosure, the CCD camera takes a color digital image of each well on the microplate. For example, when the microplate has 120 wells, 120 color images can be captured for individual evaluation. The CCD camera outputs three separate signals for each pixel, which correspond to the primary colors, such as red, green, and blue in the RGB color model. On each color image, the top surface of the microplate, which can be referred to herein as the outside-of-well region, is identified based on, for example, edge detection process. The outside-of-well region is analyzed for photometric values to determine if the colored fluidic substance (e.g., reagent or sample) are dispensed onto the surface of the microplate. In the meantime, two of the three primary colors are selected based on the dispensed fluidic substance type. Then, for each pixel, the difference and/or the ratio of the two primary colors are calculated. The calculated difference or ratio is compared to a first reference value. This first reference value can vary depending on the type of fluidic substance. The computer console can store one or more first reference values for each fluidic substance that is registered on the computer console to be used on the instrument 100. By way of example, the computer console for this system holds 99 or more of first reference values for reagents and sample types used on the instrument. For each pixel, if the calculated difference or ratio does not meet the first reference value (e.g., the calculated difference or ratio is above or below the first reference value), then a value of one pixel is added to the total counted pixels. By way of example, each color image has 313,600 pixels total for a 560×560 digital image, so the outside-of-well region would roughly account for about 100,000 pixels total. Finally, the total counted pixels is compared to a second reference value. The second reference value is a threshold cut-off value. If the total counted pixels is greater than the second reference value, then an improper reagent dispense is flagged. Even if one well is flagged, the entire result for the microplate can be flagged. Although it is illustrated that the wells of the microplate are separately evaluated one by one, it is also possible to evaluate the appropriateness of dispensation based on two or more wells of the microplate, based on a particular region of the microplate, or based on the entire microplate.

As discussed herein, a fluidic substance (e.g., colored reagents and/or blood samples) to be dispensed on a microplate is colored. Thus, if there is no spillover or improper dispensation between wells of the microplate, an image of the surface between the wells shows the original color of the surface (or the original color of the microplate if the microplate is formed in the same color). If the fluidic substance is misdispensed on the microplate, the color of a least a portion of the surface between the wells of the microplate appears differently from the original color of the surface of the microplate. The system as described herein automatically captures the image, and evaluates the dispensation of the fluidic substance on the microplate based on the color parameters from the image.

Figure 20:
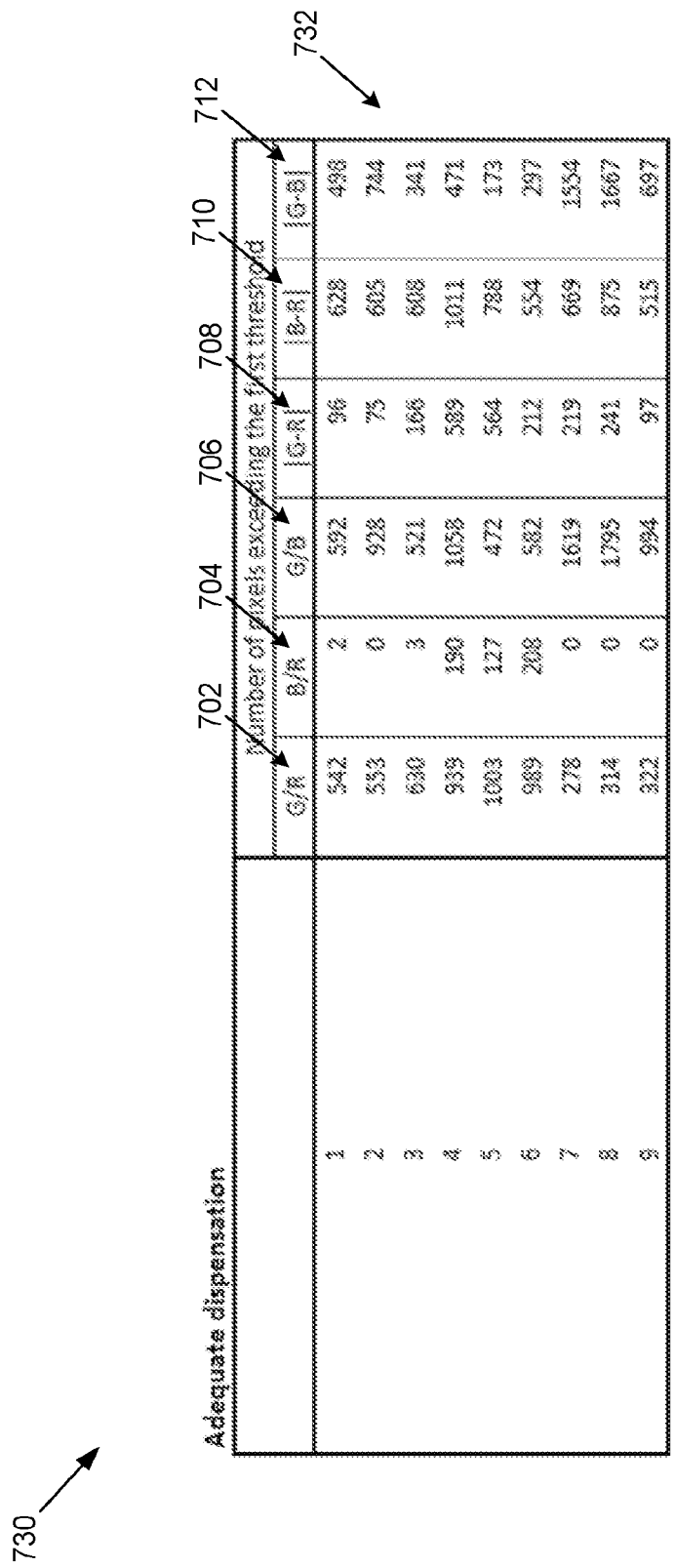
FIG. 20 illustrates an example test result table that shows adequate dispensation based on the first and second thresholds shown in FIG. 19.

Referring to FIGS. 19-21, an example set of first and second thresholds, and example test results based on the thresholds, are described. In this example, the first threshold 552 is determined to be around the maximum value among images with adequate dispensation, and the second threshold 554 is set to correspond around 1% of the number of pixels on the outside well region. In this example, each captured image has a resolution of 560×560 and thus has 313,600 pixels. The well region has a circular top portion having a radius of 165 pixels, and thus has a size of about 85,530 pixels. The outside well region has a size of about 228,070 pixels (=313,600−85,530 pixels). It is noted that the first and second thresholds, the image, the well region, and/or the outside well region can be determined and designed differently in other examples.

In this example, different reagents are considered. One example type of reagents includes Diagast reagents that are commercialized by Beckman Coulter, Inc. Another example type of reagents includes Wako reagents available from Wako Pure Chemical Industries, Ltd. The colors of anti-A (blue) and anti-B (yellow) are specified by WHO. It is noted that type of dye and concentration are different among different manufacturers. In other examples, TPHA can be used for detecting anti-Treponema antibody, which has brown color. This can be also detected by the system of the present disclosure in the same or similar manner FIG. 19 illustrates an example table 700 of the first threshold 552 and the second threshold 554. In this example, the first threshold 552 can be at least one of a ratio of green component over red component 702, a ratio of blue component over red component 704, a ratio of green component over blue component 706, a difference between green and red 708, a difference between blue and red 710, and a difference between green and blue 712, In this example, the second threshold 554 is consistent among different types of first threshold 552. In other examples, the second threshold 554 can vary by the type of first threshold 552.

FIG. 20 illustrates an example test result table 730 that shows adequate dispensation based on the first and second thresholds shown in FIG. 19. In this example, nine tests are performed for different types of the first threshold 552. In this example, all of the numbers of pixels 732 that exceeds the first threshold are smaller than the second threshold. Therefore, the dispensations are considered to be adequate.

FIG. 21 illustrates an example test result table 750 that shows inadequate dispensation based on the first and second thresholds shown in FIG. 19, depending on different fluidic substances. In this table, some of the numbers 732 (shown highlighted in italic) exceed the second threshold, which indicates inadequate dispensation.

Figure 22:
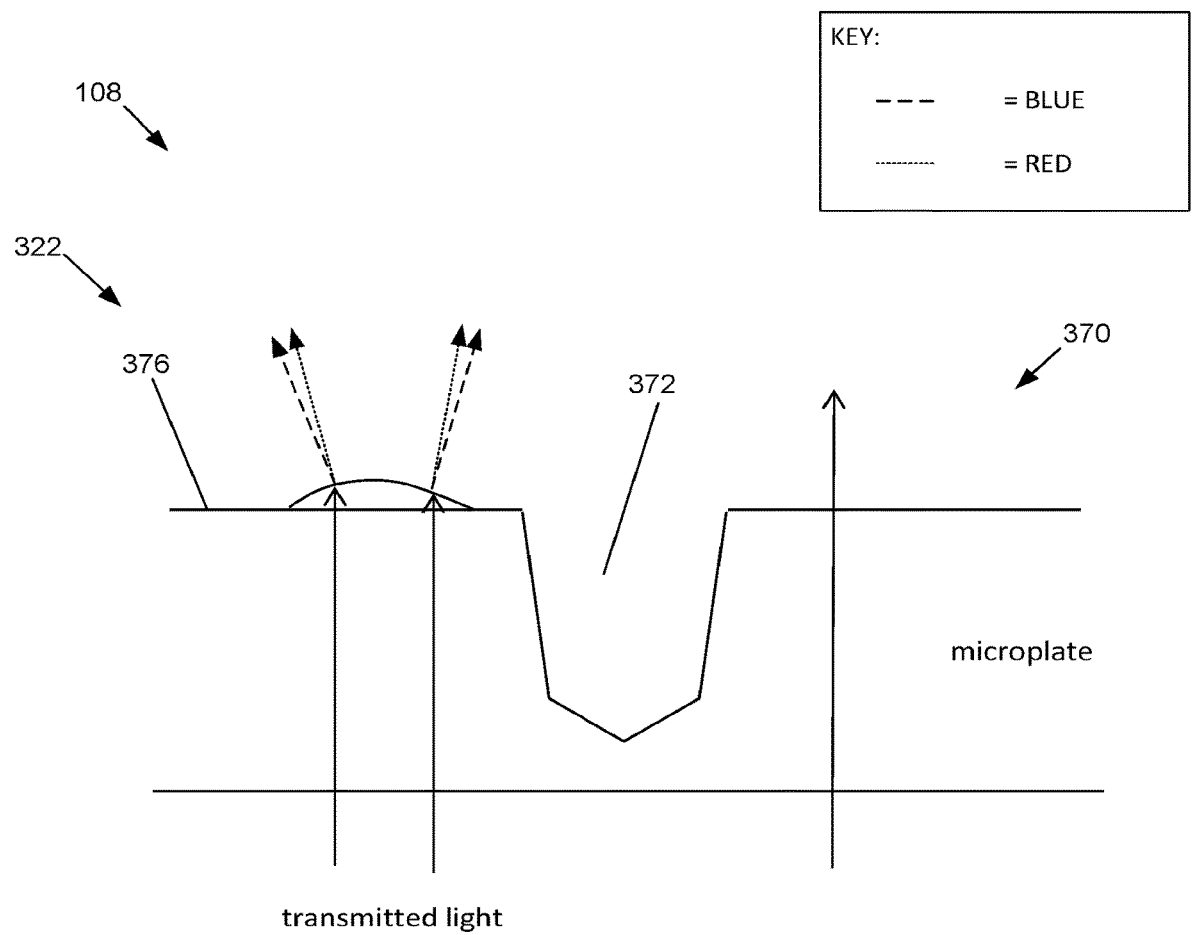
FIG. 22 illustrates another example method of detecting inadequate dispensation of a fluidic substance on a tray.

Although a detection of inadequate dispensation is primary described for a colored fluidic substance, it is also possible in other embodiments that a colorless fluidic substance can also be evaluated if it has been dispensed properly. In some examples, the system can detect one or more colors resulting from different refraction indices of light passing through the surrounding portion 322 of the tray 108, as illustrated in FIG. 22. In the FIG. 22, the light path on the left side shows inadequate dispensation, and the light path on the right side shows adequate dispensation. As shown on the right side, the surrounding portion 322 remains substantially flat, and no refraction happens, when dispensation is adequate. However, when dispensation is inadequate, a fluidic substance stays on the surrounding portion 322 and forms a curved boundary face to air. Since refraction index is varied with different wavelength, different wavelengths of light refract differently when the light passes through the fluidic substance on the surrounding portion 332 of the tray 108. Thus, colors can be detected in an image of the tray 108. By detecting such colors in the image resulting from refraction at the surrounding portion 332, dispensation of the fluidic substance on the tray 108 can be evaluated.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for evaluating dispensation of a fluidic substance in an automated analysis instrument, the method comprising:
   capturing, using an image capturing device, an image of at least a portion of a fluid receptacle;
   obtaining color components of a fragment of the image;

generating a comparison value based on the color components of the fragment of the image; and performing a comparison of the comparison value and a threshold; and determining whether to generate a flag for the fluid receptacle based on the comparison of the comparison value and the threshold;

wherein:

the method comprises, for each of a plurality of fragments of the image:

obtaining color components of that fragment of the image; and generating a comparison value for that fragment based on the color components of that fragment of the image;

the method comprises performing a set of comparisons by, for each of the plurality of fragments of the image, performing a comparison of the comparison value for that fragment and the threshold;

determining whether to generate the flag for the fluid receptacle based on the comparison of the comparison value and the threshold comprises determining whether to generate the flag for the fluid receptacle based on each comparison from the set of comparisons;

wherein determining whether to generate the flag for the fluid receptacle based on each comparison from the set of comparisons comprises determining whether a number of comparison values exceeds a second threshold.

2. The method of claim 1, wherein obtaining color components of a fragment of the image comprises obtaining a first color component of the fragment of the image, and obtaining a second color component of the fragment of the image.

3. The method of claim 2, wherein generating the comparison value based on the color components of the fragment of the image comprises generating the comparison value as a difference between the first color component and the second color component.

4. The method of claim 2, wherein generating the comparison value based on the color components of the fragment of the image comprises generating the comparison value as a ratio of the first color component and the second color component.

5. The method of claim 1, wherein the method comprises:
identifying an edge of the fluid receptacle in the image; and
identifying the plurality of fragments based on the identification of the edge of the fluid receptacle.

6. The method of claim 1, wherein the method comprises determining the threshold based on a type for the fluidic substance.

7. The method of claim 1, wherein the color components of the fragment of the image comprise a red color component, a green color component, and a blue color component.

8. The method of claim 1, wherein the fluidic substance is selected from:
a body fluid sample;
a reagent; and
a mixture of a body fluid sample and a reagent.

9. A system for evaluating dispensation of a fluidic substance in an automated analysis instrument, the system comprising:
a dispense device configured to dispense the fluidic substance into a fluid receptacle;
an image capturing device;
at least one processing device; and
at least one computer readable storage medium storing software instructions that, when executed by the at least one processing device, cause the system to perform a method comprising:

capturing, using the image capturing device, an image of at least a portion of a fluid receptacle;

obtaining color components of a fragment of the image;

generating a comparison value based on the color components of the fragment of the image; and performing a comparison of the comparison value and a threshold; and determining whether to generate a flag for the fluid receptacle based on the comparison of the comparison value and the threshold;

wherein:

the method comprises, for each of a plurality of fragments of the image:

obtaining color components of that fragment of the image; and generating a comparison value for that fragment based on the color components of that fragment of the image;

the method comprises performing a set of comparisons by, for each of the plurality of fragments of the image, performing a comparison of the comparison value for that fragment and the threshold;

determining whether to generate the flag for the fluid receptacle based on the comparison of the comparison value and the threshold comprises determining whether to generate the flag for the fluid receptacle based on each comparison from the set of comparisons;

wherein determining whether the generate the flag for the fluid receptacle based on each comparison from the set of comparisons comprises determining whether a number of comparison values exceeds a second threshold.

10. The system of claim 9, wherein obtaining color components of a fragment of the image comprises obtaining a first color component of the fragment of the image, and obtaining a second color component of the fragment of the image.

11. The system of claim 10, wherein generating the comparison value based on the color components of the fragment of the image comprises generating the comparison value as a difference between the first color component and the second color component.

12. The system of claim 10, wherein generating the comparison value based on the color components of the fragment of the image comprises generating the comparison value as a ratio of the first color component and the second color component.

13. The system of claim 9, wherein the method comprises:
identifying an edge of the fluid receptacle in the image; and
identifying the plurality of fragments based on the identification of the edge of the fluid receptacle.

14. The system of claim 9, wherein the method comprises determining the threshold based on a type for the fluidic substance.

15. The system of claim 9, wherein the color components of the fragment of the image comprise a red color component, a green color component, and a blue color component.

16. The system of claim 9, wherein the fluidic substance is selected from:
a body fluid sample;
a reagent; and
a mixture of a body fluid sample and a reagent.

17. A method for evaluating dispensation of a fluidic substance in an automated analysis instrument, the method comprising:
- capturing, using an image capturing device, an image of at least a portion of a fluid receptacle;
- obtaining color components of a fragment of the image;
- generating a comparison value based on the color components of the fragment of the image; and
- performing a comparison of the comparison value and a threshold; and
- determining whether to generate a flag for the fluid receptacle based on the comparison of the comparison value and the threshold;
- wherein obtaining color components of a fragment of the image comprises obtaining a first color component of the fragment of the image, and obtaining a second color component of the fragment of the image;
- wherein generating the comparison value based on the color components of the fragment of the image comprises generating the comparison value as a ratio of the first color component and the second color component.

18. The method of claim 17, wherein the method comprises determining the threshold based on a type for the fluidic substance.

19. A system for evaluating dispensation of a fluidic substance in an automated analysis instrument, the system comprising:
- a dispense device configured to dispense the fluidic substance into a fluid receptacle;
- an image capturing device;
- at least one processing device; and
- at least one computer readable storage medium storing software instructions that, when executed by the at least one processing device, cause the system to perform a method comprising:
  - capturing, using the image capturing device, an image of at least a portion of a fluid receptacle;
  - obtaining color components of a fragment of the image;
  - generating a comparison value based on the color components of the fragment of the image; and
  - performing a comparison of the comparison value and a threshold; and
  - determining whether to generate a flag for the fluid receptacle based on the comparison of the comparison value and the threshold;
- wherein obtaining color components of a fragment of the image comprises obtaining a first color component of the fragment of the image, and obtaining a second color component of the fragment of the image; and
- wherein generating the comparison value based on the color components of the fragment of the image comprises generating the comparison value as a ratio of the first color component and the second color component.

20. The system of claim 19, wherein the method comprises determining the threshold based on a type for the fluidic substance.

* * * * *